United States Patent
Choi et al.

(10) Patent No.: US 10,469,428 B2
(45) Date of Patent: Nov. 5, 2019

(54) APPARATUS AND METHOD FOR TRANSMITTING MESSAGE

(71) Applicant: Samsung Electronics Co., Ltd., Suwon-si, Gyeonggi-do (KR)

(72) Inventors: Bo-Kun Choi, Seoul (KR); Seung-Nyun Kim, Incheon (KR); Doo-Suk Kang, Suwon-si (KR); Geon-Soo Kim, Suwon-si (KR); Yong-Joon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 585 days.

(21) Appl. No.: 14/625,409

(22) Filed: Feb. 18, 2015

(65) Prior Publication Data

US 2015/0244665 A1    Aug. 27, 2015

Related U.S. Application Data

(60) Provisional application No. 61/942,968, filed on Feb. 21, 2014.

(30) Foreign Application Priority Data

Dec. 19, 2014   (KR) ................. 10-2014-0184371

(51) Int. Cl.
*H04L 25/58*   (2006.01)
*H04L 12/58*   (2006.01)

(52) U.S. Cl.
CPC ............ *H04L 51/24* (2013.01); *H04L 51/046* (2013.01)

(58) Field of Classification Search
CPC ..... H04L 51/046; H04L 51/24; H04L 12/585; H04L 12/58; H04L 12/581; H04L 12/5855; H04L 29/08072; H04L 29/06; G06Q 10/107
See application file for complete search history.

(56) References Cited

U.S. PATENT DOCUMENTS

| | | | |
|---|---|---|---|
| 2011/0269421 A1* | 11/2011 | Moore | H04L 12/14 455/406 |
| 2012/0060100 A1* | 3/2012 | Sherwood | H04N 21/4122 715/748 |
| 2013/0316746 A1* | 11/2013 | Miller | H04L 51/30 455/466 |
| 2014/0143356 A1* | 5/2014 | Park | H04L 51/02 709/206 |
| 2015/0095436 A1* | 4/2015 | Murata | H04L 51/32 709/206 |
| 2016/0080579 A1* | 3/2016 | Tuli | H04M 15/8038 455/406 |

FOREIGN PATENT DOCUMENTS

KR          10-0700521 B1      3/2007

* cited by examiner

*Primary Examiner* — Abdullahi E Salad
(74) *Attorney, Agent, or Firm* — Jefferson IP Law, LLP

(57) ABSTRACT

A method for transmitting a message to at least one device by an electronic device is provided. The method includes determining status information of at least one device connected with the electronic device, generating a message, based on the status information of the at least one device, and transmitting the message to the at least one device.

17 Claims, 18 Drawing Sheets

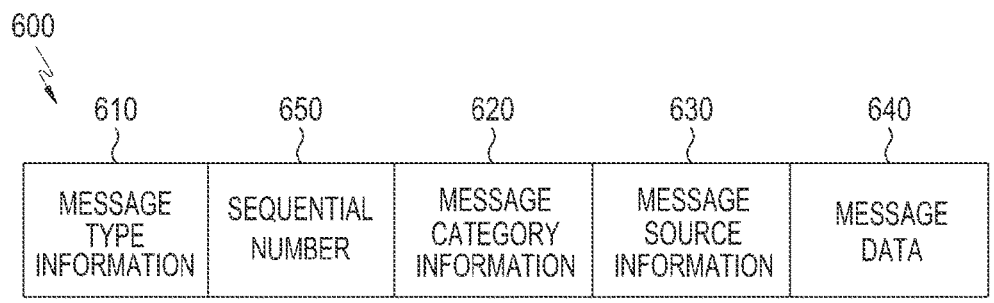
FIG.6
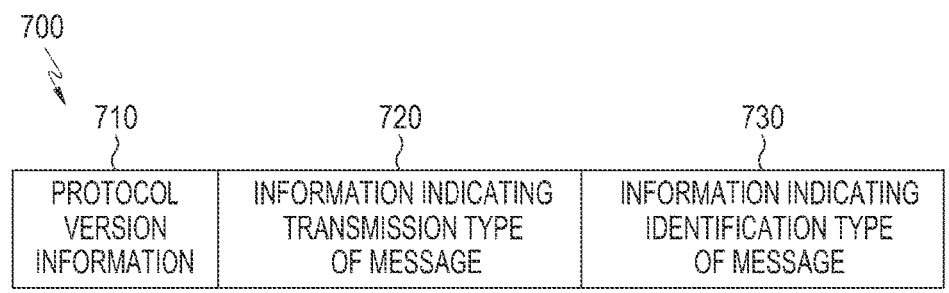
FIG.7A
| Category ID | Value |
|---|---|
| Other | 0 |
| IncomingCall | 1 |
| MissedCall | 2 |
| Email | 3 |
| Voicemail | 4 |
| Schedule | 5 |
| Alarm | 6 |
| News | 7 |
| HealthAndFitness | 8 |
| BusinessAndFinance | 9 |
| Category ID | Value |
|---|---|
| Weather | 10 |
| PictureAndMove | 11 |
| Contacts | 12 |
| Location | 13 |
| Entertainment | 14 |
| Social | 15 |
| Message | 16 |
| Car (OBD) | 17 |
| Reserved | 18 ~ 255 |
| | |
FIG.7B

APPARATUS AND METHOD FOR TRANSMITTING MESSAGE

CROSS-REFERENCE TO RELATED APPLICATION(S)

This application claims the benefit under 35 U.S.C. § 119(e) of a US Provisional application filed on Feb. 21, 2014 in the U.S. Patent and Trademark Office and assigned Ser. No. 61/942,968, and under 35 U.S.C. § 119(a) of a Korean patent application filed on Dec. 19, 2014 in the Korean Intellectual Property Office and assigned Serial number 10-2014-0184371, the entire disclosures of which are hereby incorporated by reference.

TECHNICAL FIELD

The present disclosure relates to a technique for providing a notification in an electronic device.

BACKGROUND

Recently, various services and additional functions provided in electronic devices have expanded. To improve effective values of the electronic devices and satisfy various demands of users, a variety of applications executable on the electronic devices have been developed.

The electronic device stores and executes default applications manufactured by a manufacturer thereof and installed therein and additional applications downloaded from an application sales website through the Internet. The additional applications may be developed by general users and registered on the sales website. Thus, anyone who has developed applications may freely sell them to users of the mobile devices on the application sales websites. Accordingly, at present, hundreds of thousands of free or paid applications are available to the mobile devices depending on the specifications of the devices.

Among the hundreds of thousands of applications, some applications provide a notification service for an event occurring in the application. For example, an email application provides a notification notifying reception of a new e-mail and an instant message application provides a notification notifying reception of a new message.

The aforementioned notification service is generally provided for execution of an application in a single electronic device. As various auxiliary devices (for example, a smart watch, smart glasses, and the like) connectable to an electronic device have been developed and spread, there is a need for a method for smoothly providing a notification service to the auxiliary devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for efficiently providing a notification message to various auxiliary devices connected to an electronic device.

Other objects to be provided in the present disclosure may be understood by embodiments described below.

In accordance with an aspect of the present disclosure, a method for transmitting a message to at least one device by an electronic device is provided. The method includes determining status information of at least one device connected with the electronic device, generating a message, based on the status information of the at least one device, and transmitting the message to the at least one device.

In accordance with another aspect of the present disclosure, an electronic device for providing a notification message, the electronic device is provided. The electronic device includes a connectivity manager configured to manage connection with at least one device, a host manager configured to determine status information of at least one device connected to the electronic device and to control a function of the electronic device, and a message manager configured to determine generation of a notification event, to generate a message based on the status information of the at least one device, and to transmit the generated message to the at least one device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates a notification message generated in a message providing method according to an embodiment of the present disclosure;

FIG. 7A illustrates message type information included in a notification message according to an embodiment of the present disclosure;

FIG. 7B illustrates message category information included in a notification message according to an embodiment of the present disclosure;

Throughout the drawings, like reference numerals will be understood to refer to like parts, components, and structures.

DETAILED DESCRIPTION

Figure 1:
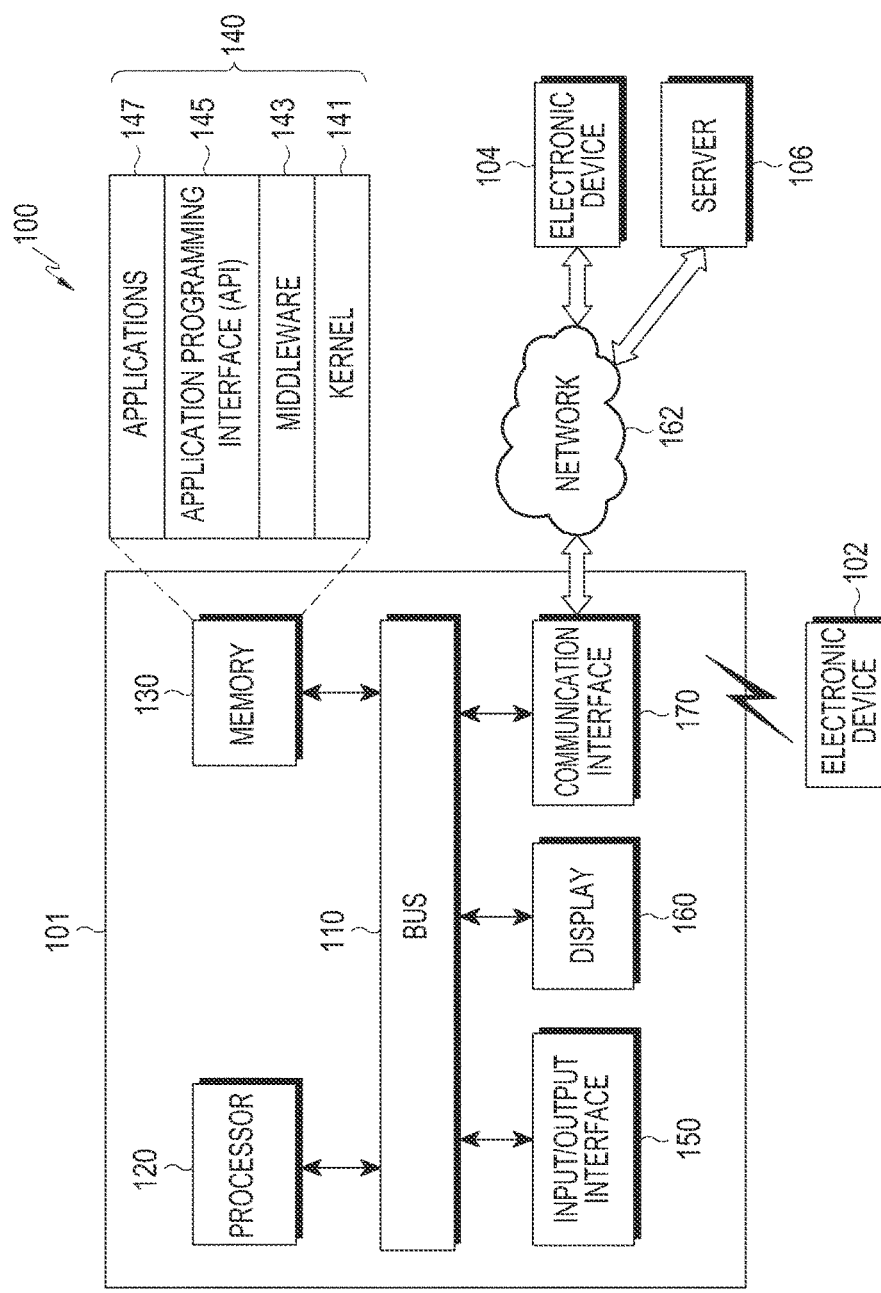
FIG. 1 illustrates an example of a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms "have", "may have", "include", or "may include" used in various embodiments of the present disclosure indicate an existence of disclosed function, operation, or component, but do not limit an existence of one or more other functions, operations, or components.

Herein, the expressions such as "A or B", "at least one of A or/B", and "one or more of A or/and B" may include all possible combinations of items listed together. For example, "A or B", "at least one of A or/B", and "one or more of A or/and B" may refer to (1) including at least one A, (2) including at least one B, and (3) including at least one A and at least one B.

Although ordinal numbers such as "first", "second", and so forth will be used to describe various components, those components are not limited by the terms. For example, the terms do not limit the order and/or importance of the components. The terms are used for distinguishing one component from another component. For example, a first user device and a second user device are both user devices, and indicate different user devices. Also, a first component may be referred to as a second component and likewise, a second component may also be referred to as a first component, without departing from the teaching of the present disclosure.

When it is said that a component (for example, a first component) is "connected" or "coupled" with another component (for example, a second component), the component may be directly connected with another component, or still another component (for example, a third component) may exist between the components. On the other hand, when it is said that a component is "directly connected" or "directly coupled" with another component, no component exists between the components.

As used in the present disclosure, without limitation, the phrase "configured to" may be interchangeably used with other terms, such as "suitable for," "having the capacity to," "designed to," "adapted to," "made to," or "capable of," depending on the circumstances. In certain examples, the term "configured to" may not necessarily mean "specifically designed to" in a hardware sense. Rather, in a certain context, the term "configured to" may mean "capable of" with assistance of other devices or components. For example, the phrase "a processor configured to perform A, B, and C" may mean a dedicated processor (for example, an embedded processor) for performing corresponding operations or a generic-purpose processor (for example, a Central Processing Unit (CPU) or an application processor) that may perform corresponding operations by executing one or more software programs stored in a memory device.

Terms used in various embodiments of the present disclosure are intended to describe an embodiment, rather than to limit the various embodiments of the present disclosure. As used herein, the singular forms are intended to include the plural forms as well, unless the context clearly indicates otherwise. Unless otherwise defined, all terms (including technical and scientific terms) used herein have the same meaning as commonly understood by one of ordinary skill in the art to which embodiments belong. It will be further understood that terms, such as those defined in commonly used dictionaries, should be interpreted as having a meaning that is consistent with their meaning in the specification with the context of the relevant art as understood by the artisan at the time of disclosure and will not be interpreted in an idealized or overly formal sense unless expressly so defined herein.

An electronic device according to various embodiments of the present disclosure may be a device having a short-range communication function. For example, the electronic device may be a combination of one or more of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, mobile medical equipment, an electronic bracelet, an electronic necklace, an electronic accessory, a camera, a wearable device (for example, a Head-Mounted Device (HMD) such as electronic glasses), an electronic cloth, an electronic bracelet, an electronic necklace, an electronic accessory, an electronic tattoo, and a smart watch.

The electronic device may be a smart home appliance having a short-range communication function. The smart home appliance may include, for example, a Television (TV), a Digital Video Disk (DVD) player, audio equipment, a refrigerator, an air conditioner, a vacuum cleaner, an oven, a microwave oven, a laundry machine, an air cleaner, a set-top box, a TV box (for example, Samsung HomeSync™, Apple TV™, or Google TV™), a game console, an electronic dictionary, an electronic key, a camcorder, and an electronic frame.

The electronic device may include at least one of various medical equipment (for example, Magnetic Resonance Angiography (MRA), Magnetic Resonance Imaging (MRI), Computed Tomography (CT), an imaging device, or an ultrasonic device), a navigation system, a Global Positioning System (GPS) receiver, an Event Data Recorder (EDR), a Flight Data Recorder (FDR), a vehicle infotainment device, electronic equipment for ships (for example, navigation system and gyro compass for ships), avionics, a security device, a vehicle head unit, an industrial or home robot, an Automatic Teller Machine (ATM), a Point of Sales (POS), and an Internet of things (for example, light bulbs, various sensors, electric or gas meters, sprinkler devices, fire alarms, thermostats, streetlamps, toasters, sporting goods, hot water tanks, heaters, boilers, and the like).

The electronic device may include a part of a furniture or building/structure having a communication function, an electronic board, an electronic signature receiving device, a projector, and various measuring instruments (for example, a water, electricity, gas, or electric wave measuring device). The electronic device according to various embodiments of the present disclosure may be one of the above-listed devices or a combination thereof. The electronic device according to various embodiments of the present disclosure may be a flexible device. The electronic device according to various embodiments of the present disclosure is not limited to the above-listed devices, and new electronic devices based on technology development may be included.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device (for example, an artificial intelligence electronic device).

FIG. 1 illustrates an example of a network environment according to an embodiment of the present disclosure, Referring to FIG. 1, an electronic device 101 in a network environment 100 according to an embodiment of the present disclosure may include a bus 110, a processor 120, a memory 130, an Input/Output (I/O) interface 150, a display 160, and a communication interface 170. The electronic device 101 may omit at least one of the foregoing elements or may further include other elements.

The bus 110 may include a circuit for interconnecting the elements 110 through 170 described above and for allowing communication (for example, a control message and/or data) between the elements described above.

The processor 120 may include one or more of a CPU, an Application Processor (AP), and a Communication Processor (CP). The processor 120 performs operations or data processing for control and/or communication of, for example, at least one other elements of the electronic device 101.

The memory 130 may include a volatile and/or nonvolatile memory. The memory 130 may store, for example, commands or data associated with at least one other elements of the electronic device 101. According to an embodiment of the present disclosure, the memory 130 may store software and/or a program 140. The program 140 may include, for example, a kernel 141, middleware 143, an Application Programming Interface (API) 145, and/or an application program (or an application) 147. At least some of the kernel 141, the middleware 143, and the API 145 may be referred to as an Operating System (OS).

The kernel 141 controls or manages, for example, system resources (for example, the bus 110, the processor 120, or the memory 130) used to execute an operation or a function implemented in other programs (for example, the middleware 143, the API 145, or the application program 147). The kernel 141 provides an interface through which the middleware 143, the API 145, or the application program 147 accesses separate components of the electronic device 10 to control or manage the system resources.

The middleware 143 may work as an intermediary for allowing, for example, the API 145 or the application program 147 to exchange data in communication with the kernel 141. In regard to task requests received from the application program 147, the middleware 143 performs control (for example, scheduling or load balancing) with respect to the task requests, for example, by giving priorities for using a system resource (for example, the bus 110, the processor 120, or the memory 130) of the electronic device 101 to at least one of the application programs 147.

The API 145 is an interface used for the application 147 to control a function provided by the kernel 141 or the middleware 143, and may include, for example, at least one interface or function (for example, a command) for file control, window control, image processing or character control.

The I/O interface 150 serves as an interface for delivering a command or data input from a user or another external device to other component(s) of the electronic device 101. The I/O interface 150 may also output a command or data received from other component(s) of the electronic device 101 to a user or another external device.

The display 160 may include, for example, a Liquid Crystal Display (LCD), a Light Emitting Diode (LED) display, an Organic Light Emitting Diode (OLED) display, a MicroElectroMechanical System (MEMS) display, or an electronic paper display. The display 160 may display various content (for example, a text, an image, a video, an icon, or a symbol) to users. The display 16 may include a touch screen, and receives a touch, a gesture, proximity, or a hovering input, for example, by using an electronic pen or a part of a body of a user.

The communication interface 170 sets up communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). The wired communication may include, for example, at least one of a Universal Serial Bus (USB), a High Definition Multimedia Interface (HDMI), a Recommended Standard (RS)-232, and a Plain Old Telephone Service (POTS). The network 21 may include a telecommunications network, for example, at least one of a computer network (for example, a Local Area Network (LAN) or a Wide Area Network (WAN)), Internet, and a telephone network.

Each of the first external electronic device 102 and the second external electronic device 104 may be a device of the same type as or a different type than the electronic device 101. According to an embodiment of the present disclosure, the server 106 may include a group of one or more servers. According to various embodiments of the present disclosure, some or all of operations performed by the electronic device 101 may be performed in other one or more electronic devices (for example, the electronic devices 102 and 104 or the server 106). According to an embodiment of the present disclosure, when the electronic device 101 has to perform a function or a service automatically or by a request, the electronic device 101 may request another device (for example, the electronic device 102 or 104 or the server 106) to execute at least some functions associated with the function or the service, in place of or in addition to executing the function or the service. The other electronic device (for example, the electronic device 102 or 104 or the server 106) may execute the requested function or additional function and deliver the execution result to the electronic device 101. The electronic device 101 may then process or further process the received result to provide the requested function or service. To this end, for example, cloud computing, distributed computing, or client-server computing may be used.

Figure 2:
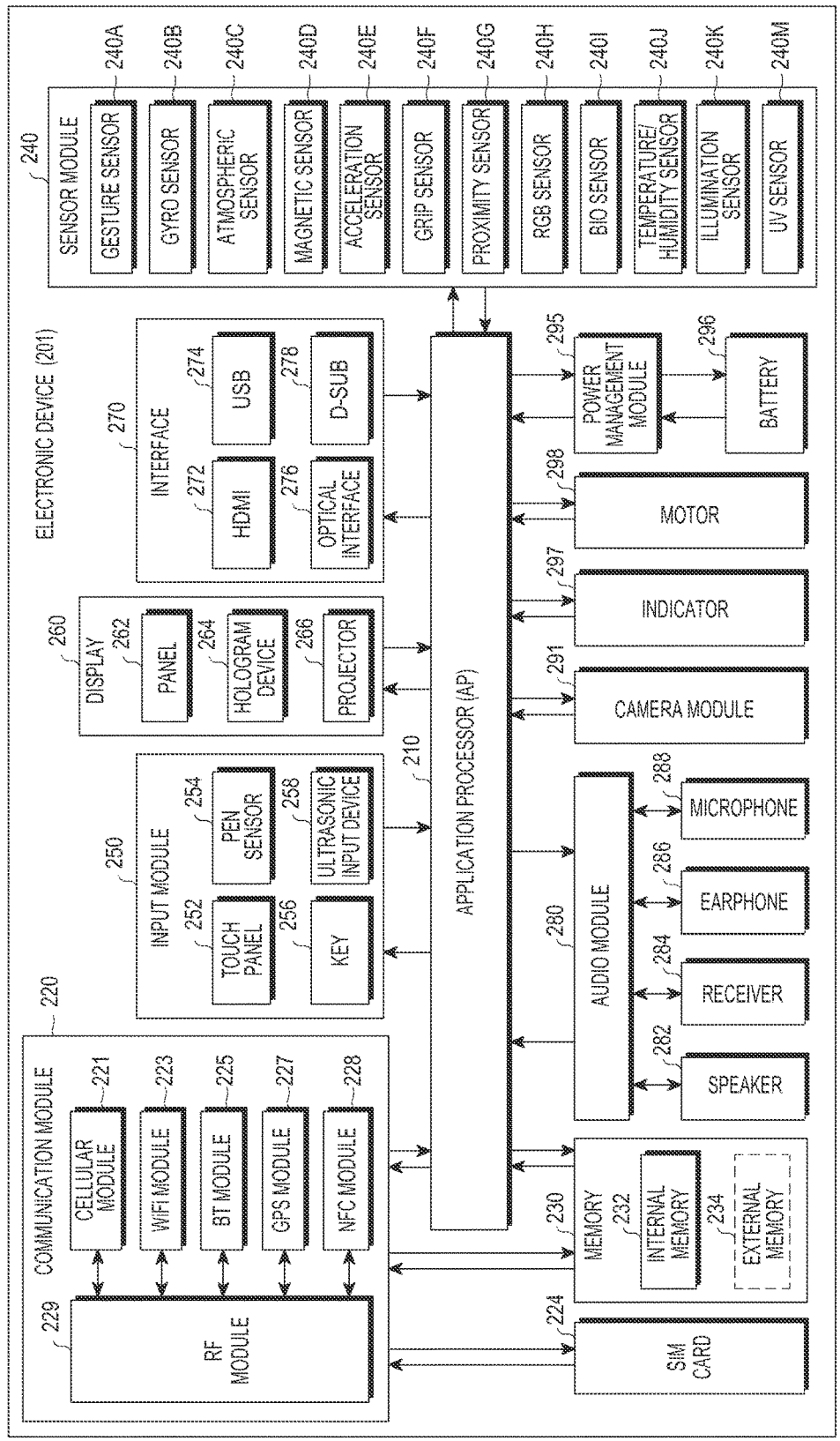
FIG. 2 is a block diagram of an electronic device according to embodiment of the present disclosure.

FIG. 2 is a block diagram of an electronic device according to an embodiment of the present disclosure.

Referring to FIG. 2, an electronic device 201 may include a whole or a part of, for example, the electronic device 101 illustrated in FIG. 1. The electronic device 201 may include one or more Application Processors (APs) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 controls multiple hardware or software elements connected to the AP 210 or performs various data processing or operations, for example, by driving an OS or an application program. The AP 210 may be implemented, for example, with a System on Chip (SoC). According to an embodiment of the present disclosure, the AP 210 may further include a Graphic Processing Unit (GPU) and/or an Image Signal Processor (ISP). The AP 210 may include at least some (for example, a cellular module 221) of the elements illustrated in FIG. 2. The AP 210 loads a command or data received from at least one of other elements (for example, a nonvolatile memory) into a volatile memory to process the command or data, and stores various data in the nonvolatile memory.

The communication module 220 may have a configuration that is the same as or similar to that of the communication interface 160 of FIG. 1. The communication module 220 may include, for example, the cellular module 221, a Wi-Fi module 223, a Bluetooth (BT) module 225, a GPS module 227, a Near Field Communication (NFC) module 228, and a Radio Frequency (RF) module 229.

The cellular module 221 provides voice communication, video communication, a text service, or an Internet service over a communication network. According to one embodiment of the present disclosure, the cellular module 221 performs identification and authentication with respect to the electronic device 201 in a communication network by using a SIM (for example, the SIM card 224). According to an embodiment of the present disclosure, the cellular module 221 may perform at least some of functions that may be provided by the AP 210. According to an embodiment, the cellular module 221 may include a CP.

Each of the Wi-Fi module 223, the BT module 225, the GPS module 227, and the NFC module 228 may include a processor for processing data transmitted and received therethrough. At least some (for example, two or more) of the cellular module 221, the Wi-Fi module 223, the BT module 225, the GPS module 227, and the NFC module 228 may be integrated into a single Integrated Chip (IC) or IC package.

The RF module 229 transmits and receives, for example, a communication signal (for example, an RF signal). The RF module 229 may include, for example, a transceiver, a Power Amp Module (PAM), a frequency filter, a Low Noise Amplifier (LNA), or an antenna. According to another embodiment of the present disclosure, at least one of the cellular module 221, the Wi-Fi module 223, the BT module 225, the GPS module 227, and the NFC module 228 transmits and receives an RF signal through a separate RF module.

The SIM card 224 may include, for example, a card including an SIM and/or an embedded SIM, and may include unique identification information (for example, an Integrated Circuit Card Identifier (ICCID)) or subscriber information (for example, an International Mobile Subscriber Identity (IMSI)).

The memory 230 (for example, the memory 130) may include, for example, an embedded memory 232 or an external memory 234. The embedded memory 232 may include, for example, at least one of a volatile memory (for example, a Dynamic Random Access Memory (DRAM) or Synchronous Dynamic RAM (SDRAM), a nonvolatile memory (for example, an One Time Programmable ROM (OTPROM), a Programmable ROM (PROM), an Erasable and Programmable ROM (EPROM), an Electrically Erasable and Programmable ROM (EEPROM), a mask ROM, a flash ROM, or a flash memory (such as a NAND flash or a NOR flash), a hard drive, and a Solid State Drive (SSD).

The external memory 234 may further include a flash drive, for example, a Compact Flash (CF), a Secure Digital (SD), a micro-Secure Digital (SD), a mini-SD, an Extreme Digital (xD), or a memory stick. The external memory 234 may be functionally and/or physically connected with the electronic device 201 through various interfaces.

The sensor module 240 measures a physical amount or senses an operation status of the electronic device 201 to convert the measured or sensed information into an electric signal. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (for example, a Red, Green, Blue (RGB) sensor), a biometric sensor 240I, a temperature/humidity sensor 240J, an illumination sensor 240K, and an Ultra Violet (UV) sensor 240M. Additionally or alternatively, the sensor module 240 may further include an E-nose sensor, an Electromyography (EMG) sensor, an ElectroEncephaloGram (EEG) sensor, an ElectroCardio-Gram (ECG) sensor, an Infrared (IR) sensor, an iris sensor, and/or a fingerprint sensor, which may also be included as a part of the biometric sensor 240I. The sensor module 240 may further include a control circuit for controlling at least one of the sensors included therein. The electronic device 20 may further include a processor configured to control the sensor module 240 as a part of or separately from the AP 210, to control the sensor module 240 when the AP 210 is in a sleep status.

The input device 250 may include, for example, a touch panel 252, a (digital) pen sensor 254, a key 256, or an ultrasonic input device 258. The touch panel 252 may use, for example, at least one of a capacitive type, a resistive type, an IR type, and an ultrasonic type. The touch panel 252 may further include a control circuit. The touch panel 252 may further include a tactile layer to provide tactile reaction to a user.

The (digital) pen sensor 254 may be, for example, a part of a touch panel or a separate recognition sheet. The key 256 may include, for example, a physical button, an optical key, or a keypad. The ultrasonic input device 258 may sense audio waves and check data through a microphone (MIC) (for example, a MIC 288) in the electronic device 201 through an input means for generating an ultrasonic signal.

The display 260 (for example, the display 160) may include a panel 262, a hologram device 264, or a projector 266. The panel 262 may have a configuration that is the same as or similar to that of the display 160 of FIG. 1. The panel 262 may be implemented as, for example, being flexible, transparent, or wearable. The panel 262 may be configured as a single module with the touch panel 252. The hologram device 264 shows a cubic image in the air by using interference of light. The projector 266 displays an image by projecting light onto a screen that may be positioned, for example, inside or outside the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a USB 274, an optical interface 276, or a D-subminiature (sub) 278. The interface 270 may be included in, for example, the communication interface 160 illustrated in FIG. 1. Additionally or alternatively, the interface 270 may include, for example, a Mobile High-Definition Link (MHL) interface, a Secure Digital (SD) card/Multi-Media Card (MMC) interface, or an Infrared Data Association (IrDA) standard interface.

The audio module 280 interchangeably converts sound and an electric signal. At least some components of the audio module 280 may be included in, for example, the I/O interface 140 illustrated in FIG. 1. The audio module 280 may process sound information that is input or output through the speaker 282, the receiver 284, the earphone 286, or the microphone 288.

The camera module 291 is a device capable of capturing a still image and a moving image, and may include one or more image sensors (e.g., a front sensor or a rear sensor), a lens, an ISP, or a flash (for example, an LED or a xenon lamp).

The power management module 295 manages power of the electronic device 201. According to an embodiment, the power management module 295 may include a Power Management Integrated Circuit (PMIC), a charger IC, or a battery or fuel gauge. The PMIC may use a wired and/or wireless charging scheme. The wireless charging scheme may include, for example, a magnetic resonance scheme, a magnetic induction scheme, or an electromagnetic wave scheme, and an additional circuit for wireless charging, for example, a coil loop, a resonance circuit, or a rectifier may be further included. The battery gauge measures the remaining capacity of the battery 296, and a voltage, a current, or a temperature of the battery 296 during charging. The battery 296 may include, for example, a rechargeable battery and/or a solar battery.

The indicator 299 displays a specific status, such as a booting status, a message status, or a charging status, of the electronic device 201 or a part thereof (for example, the AP 210). The motor 298 converts an electric signal into mechanical vibration, and generates vibration or a haptic effect. Although not shown, a processing device (for example, a GPU) for supporting a mobile TV may be included. The processing device for supporting the mobile TV processes media data complying with the standard such as Digital Multimedia Broadcasting (DMB), Digital Video Broadcasting (DVB), or a media flow.

Each of the above-described elements of the electronic device may include one or more components, and the name of the element may vary with a type of the electronic device. According to various embodiments of the present disclosure, the electronic device may include at least one of the above-described elements, and some elements may be omitted or other elements may be further included. Also, some of the elements of the electronic device may be coupled into one entity to perform the same functions of the elements as those of the elements before coupled.

Figure 3:
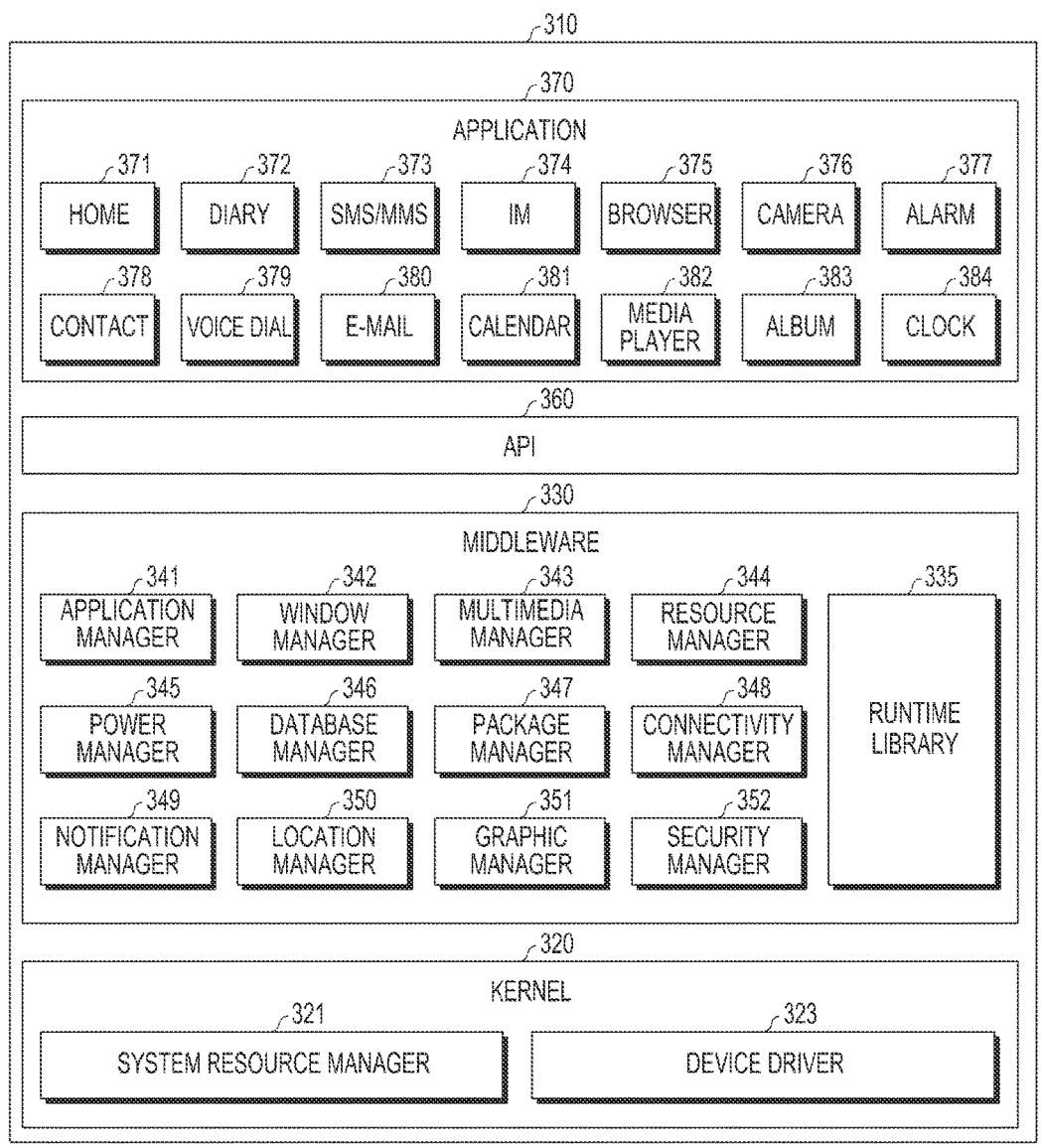
FIG. 3 is a block diagram of a program module according to an embodiment of the present disclosure.

FIG. 3 is a block diagram of a program module 310 according to an embodiment of the present disclosure.

Referring to FIG. 3, the program module 310 (e.g., the program 140) may include an OS for controlling resources related to an electronic device (e.g., the electronic device 101) and/or various applications (e.g., the application programs 147) driven on the OS. For example, the OS may be Android, iOS, Windows, Symbian, Tizen, Baia, or the like.

The program module 310 may include a kernel 320, middleware 330, an API 360, and/or applications 370. At least a part of the program module 310 may be preloaded on an electronic device or may be downloaded from a server (e.g., the server 106).

The kernel 320 (e.g., the kernel 141 of FIG. 1) may include a system resource manager 321 and/or a device driver 323. The system resource manager 321 controls, allocates, or collects system resources. The system resource manager 321 may include, for example, a process manager, a memory manager, and a file system manager. The device driver 323 may include, for example, a display driver, a camera driver, a BT driver, a shared memory driver, a USB driver, a keypad driver, a WiFi driver, an audio driver, or an Inter-Process Communication (IPC) driver.

The middleware 330 provides functions commonly necessary for the applications 370, or provides various functions to the applications 370 through the API 360 such that the applications 370 may efficiently use restricted system resources within the electronic device. The middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language during execution of one of the applications 370. According to an embodiment, the runtime library 335 may perform an input/output, memory management, and/or a function for an arithmetic function.

The application manager 341 manages a life cycle of at least one of the applications 370. The window manager 342 manages Graphical User Interface (GUI) resources used by a screen. The multimedia manager 343 detects formats used for reproduction of various media files, and performs encoding and/or decoding of a media file by using a codec suitable for the corresponding format. The resource manager 344 manages resources such as a source code, a memory, and a storage space of at least one of the applications 370.

The power manager 345 manages a battery and/or power, while operating together with a Basic Input/Output System (BIOS), and provides power information used for operation. The database manager 346 manages generation, search, and/or change of a database to be used by at least one of the applications 370. The package manager 347 manages installation and/or an update of an application distributed in a form of a package file.

The connectivity manager 348 manages wireless connectivity such as Wi-Fi or Bluetooth. The notification manager 349 displays and/or notifies an event, such as an arrival message, a promise, a proximity notification, and the like, in such a way not to disturb a user. The location manager 350 manages location information of an electronic device. The graphic manager 351 manages a graphic effect which will be provided to a user, and/or a user interface related to the graphic effect. The security manager 352 provides all security functions used for system security and/or user authentication. When an electronic device (for example, the electronic device 101), has a telephone call function, the middleware 330 may further include a telephony manager (not illustrated) for managing a voice and/or video communication function of the electronic device.

The middleware 330 may include a middleware module that forms a combination of various functions of the aforementioned elements. The middleware 330 provides modules specialized according to types of OSs in order to provide differentiated functions. Further, the middleware 330 dynamically removes some of the existing elements and/or adds new elements.

The API 360 (e.g., the API 145) is a set of API programming functions, and may be provided with a different configuration according to the OS. For example, in a case of Android or iOS, one API set may be provided for each of platforms, and in a case of Tizen, two or more API sets may be provided for each platform.

The applications 370 (e.g., the application program 147) may include, for example, a home application 371 a dialer application 372, a Short Messaging Service (SMS)/Multimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, a clock application 384, and one or more applications capable of providing a function such as health care (for example, measurement of an exercise volume or blood sugar) or providing of environment information (for example, atmospheric pressure, humidity, or temperature information).

The applications 370 may include an application for supporting information exchange between the electronic device (for example, the electronic device 101) and an external electronic device (for example, the electronic device 102 or 104), which will be referred to as an "information exchange application" for convenience. The information exchange application may include, for example, a notification relay application for relaying particular information to the external electronic device or a device management application for managing the external electronic device.

For example, the notification relay application relays notification information generated in the other applications (for example, the SMS/MMS application, the email application, the health care application, or the environment information application) of the electronic device to the external electronic device (for example, the electronic device 102 or 104). The notification relay application receives and provides the notification information from the external electronic device to the user. The device management application manages (e.g., installs, deletes, or updates) at least one function (e.g., power-on/power-off of the external electronic device or some components or display brightness or resolution control) of the external electronic device (e.g., the electronic device 104) communicating with the electronic device, the application running on the external electronic device, or a service (e.g., a call service or a messaging service) provided by the external electronic device.

The applications 370 may include an application (e.g., a health care application) designated based on an attribute (e.g., a mobile medical device as a type of the electronic device) of the external electronic device (e.g., the electronic device 102 or 104). The applications 370 may include an application received from the external electronic device (e.g., the server 106 or the electronic device 102 or 104). The applications 370 may include a preloaded application or a third party application that may be downloaded from a server. The names of the elements of the program module 310 according to the illustrated embodiment may vary with a type of an OS.

At least a part of the program module 310 may be implemented by software, firmware, hardware, or a combination of at least two of them. Further, at least a part of the program module 310 may be implemented by, for example, a processor (e.g., the AP 210). At least a part of the program module 310 may include, for example, a module, a program, a routine, sets of instructions, and a process for performing one or more functions.

The term "module" used in various embodiments of the present disclosure may refer to, for example, a "unit" including one of hardware, software, and firmware, or a combination of two or more thereof. The term "module" can be interchangeable with other terms such as unit, logic, logical block, component, or circuit. A "module" may be a minimum unit of integrally configured components or a part thereof. A "module" may be a minimum unit for performing one or more functions or a part thereof. A "module" may be mechanically or electronically implemented. For example, a "module" according to various embodiments of the present disclosure may include at least one of an Application-Specific Integrated Circuit (ASIC) chip, a Field-Programmable Gate Arrays (FPGAs), and a programmable-logic device for performing operations which has been known or will be developed in the future.

At least a part of a device (for example, modules or functions thereof) or a method (e.g., operations) according to various embodiments of the present disclosure may be implemented by instructions stored in the form of program modules in computer-readable storage media. When the instruction is executed by a processor (e.g., the processor 120), the one or more processors may perform a function corresponding to the instruction. The computer-readable storage medium may be, for example, the memory 130.

The computer readable recording media may include a magnetic media such as a hard disc, a floppy disc, and a magnetic tape, an optical recording media such as a Compact Disc Read Only Memory (CD-ROM) and a Digital Versatile Disc (DVD), a magneto-optical media such as a floptical disk, and a hardware device, such as a Read Only Memory (ROM), a Random Access Memory (RAM), and a flash memory, specifically configured to store and execute program instructions. In addition, the program instructions may include high class language codes, which may be executed in a computer by using an interpreter, as well as machine codes made by a compiler. The aforementioned hardware device may be configured to operate as one or more software modules in order to perform the operation of the present disclosure, and vice versa.

The module or program module according to various embodiments of the present disclosure may include at least one of the above-described elements, exclude some of them, or further include other elements. The operations performed by the module, the program module, or other elements according to various embodiments of the present disclosure may be executed in a sequential, parallel, repeated, or heuristic manner. Also, some operations may be executed based on a different order, may be omitted, or may additionally include another operation.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

According to an embodiment of the present disclosure, a connectivity manager 1430 manages connection with at least one device, a host manager 1410 determines status information of at least one device connected with the electronic device and controls a function of the electronic device, and a message manger 1420 determines occurrence of a notification event, generates a message, taking the status information of the at least one device into account, and delivers the message to the at least one device.

According to an embodiment of the present disclosure, the status information may include at least one of hardware information, OS information, application installation information, security information, function information, information of whether the device is currently used, information of an application that is currently executed in the device, hardware operation status information, a battery status, a network status, and sensor-collected information.

According to an embodiment of the present disclosure, the at least one device may include a first device and a second device, and the message manger 1420 generates a first message based on status information of the first device and a second message based on status information of the second device.

According to an embodiment of the present disclosure, the message manager 1420 determines priorities of the at least one device, taking the status information of the at least one device into account, and delivers the message to the at least one device sequentially according to the priorities.

According to an embodiment of the present disclosure, the message may include security information for authenticating a user of the connected device.

According to an embodiment of the present disclosure, the message manager 1420 provides a first message including security information for authenticating a user of the electronic device to a first device, receives a response with respect to the user authentication from the first device, and sends a second message including at least one of a notification indicator indicating generation of the message, title information indicating a subject of the message, and text content included in the message to at least one second device.

Figure 4:
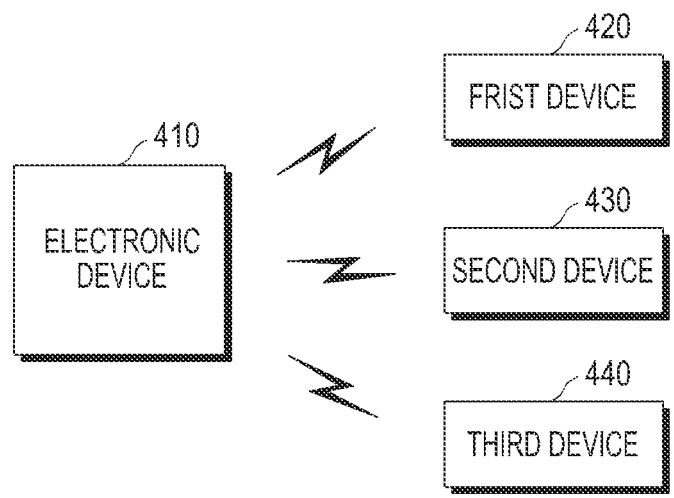
FIG. 4 illustrates a system to which a message providing method is applied according to an embodiment of the present disclosure.

FIG. 4 illustrates a system to which a message providing method according to an embodiment of the present disclosure.

Referring to FIG. 4, the system to which the message providing method according to various embodiments of the present disclosure is applied may include an electronic device 410 (e.g., the electronic device 101, 102, or 104 illustrated in FIG. 1) and at least one device 420, 430, and 440 connected with the electronic device 410.

The electronic device 410 may be a portable terminal. The at least one device 420, 430, and 440 may be a wearable device connected with the electronic device 410. For example, the wearable device may be a watch-type device, a glass-type device, a band-type device, a necklace-type device, a Head Mounted Device (HMD), or the like.

The electronic device 410 may provide notification information generated during driving of at least one applications provided therein to at least one device, for example, first through third devices 420, 430, and 440. To this end, the electronic device 410 may initiate connection with the at least one device 420, 430, and 440, and the electronic device 410 may secure connectivity with the at least one device 420, 430, and 440. For example, the electronic device 410 may perform discovery, pairing, auto-connection, recovery, and the like. The electronic device 410 receives information (e.g., status information of a connected device) necessary for providing a notification message to the at least one device 420, 430, and 440 from the at least one device 420, 430, and 440.

The at least one device connected to the electronic device 410 are the devices 420, 430, and 440, as an example, but the present disclosure does not limit the number of devices. In the present disclosure, the at least one device may be enough if they can be connected with the electronic device 410, and one or more devices may be included.

Figure 5:
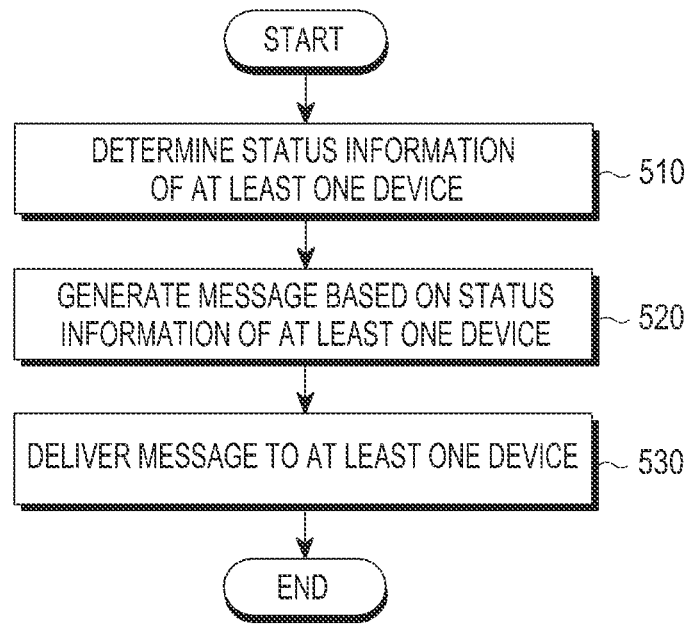
FIG. 5 is a flowchart of a message providing method according to an embodiment of the present disclosure.

FIG. 5 is a flowchart of a message providing method according to an embodiment of the present disclosure.

Referring to FIG. 5, a message providing method according to various embodiments of the present disclosure may include operation 510 of determining status information of the at least one device 420, 430, and 440 connected with the electronic device 410, operation 520 of generating a notification message, taking the status information of the at least one device 420, 430, and 440 into account, and operation 530 of delivering the message to the at least one device 420, 430, and 440.

Operation 510 may include determining whether a trigger for notification is generated from an application supporting a notification function. The trigger for notification may be generated when an application provided in the electronic device 410 is driven and generates a message having a notification function, or may be generated as a message is received from an external electronic device. The message received by the electronic device 410 from the external electronic device may include at least one of type information of the message, a type of an application corresponding to the message, and a type of content included in the message.

For example, during execution of a calendar application provided in the electronic device 410, when an appointment that is preset by a user has arrived, the calendar application may generate a message indicating the appointment. In this process, the electronic device 410 performs the operation of determining whether a trigger for the notification is generated.

In another example, once a new email is received at an account allocated to the user of the electronic device 410, a server device for managing emails provides an event notifying reception of the new email to the electronic device 410. Thus, the email application provided in the electronic device 410 displays a trigger notifying reception of the new e-mail by using an indicator, an icon, or the like. In the meantime, the electronic device 410 performs the operation of determining whether the trigger for the notification is generated.

Operation 510 involves determining the status information of the at least one device 420, 430, and 440. The status information determined in this process may include static status information or dynamic status information. The static status information is information collected and stored during establishment of connection with the at least one device 420, 430, and 440 or collected at the request of the user. The static status information may include information that is allocated to a device and does not change. For example, the static status information may include at least one of DeviceID information, DeviceName information, Platform information, AppList information, AppVersion information, Connectivity information, ProvidingFeature (or RequiredFeature) information, Security information, Noti. Level information, AppFeature information, P/C Peer-to-peer information, P/C authentication method information, H/W information, available sensor information, supported file format information, and the like.

The DeviceID information may include information for identifying a connected device. For example, DeviceID may include a Medium Access Control (MAC) address of the connected device.

The DeviceName information may include a name of a device designated or input by the user.

The Platform information may include information indicating a type of a platform applied to the device. The Platform information may include characteristic information of the device as well as information about an OS.

The AppList information may include information indicating a list of applications installed in the device.

The AppVersion information may include information indicating a version of an application installed in the device.

The Connectivity information may include information indicating a device-specific supportable communication scheme.

The ProvidingFeature (or RequiredFeature) information may include information indicating a function corresponding to a role between the electronic device and the device.

The Security information may include information indicating a security level defined in the device.

The Noti. Level information may include information indicating a level in which the device may receive a message.

The AppFeature information may include information indicating a main function for each version of an application.

The AppFeature information may be used to determine compatibility of applications provided in the electronic device and the device.

The P/C Peer-to-peer information may include information indicating a device's connection scheme.

The P/C authentication scheme information may include information indicating a scheme in which a device performs authentication.

The dynamic status information may include information that may change dynamically in the device. For example, the dynamic status information may include information indicating whether the device is currently driven, information about an application currently executed by the device, information about an application that stands by in a background, a CPU operation status, a screen control status, a battery status, a network status, sensor-collected information, and so forth.

In operation 520, a notification message may be generated, considering the status information of the at least one device 420, 430, and 440. Operation 520 may include reconfiguring the message adaptively for the status information of the at least one device 420, 430, and 440 to generate the notification message. For example, the electronic device 410 may reconfigure the message to deliver only essential information such as title or sender information of an email to a band-type device having a limitation in a screen and to deliver text content of the email to a smart watch-type device.

Operation 520 may further include selecting the at least one device 420, 430, and 440 to which the message to be generated is destined. The at least one device 420, 430, and 440 may be selected based on the status information of the at least one device 420, 430, and 440. The operation of selecting the at least one device 420, 430, and 440 may include selecting a single device or selecting a plurality of devices.

If the operation of selecting the at least one device 420, 430, and 440 includes selecting a plurality of devices, the operation of generating a message may include generating a plurality of notification messages corresponding to a plurality of devices, respectively. The operation of generating a message may include generating a first message based on status information of the first device and generating a second message based on status information of the second device.

In another example, the electronic device 410 may select the at least one device 420, 430, and 440 based on information included in a message received from an external electronic device. The message received by the electronic device 410 from the external electronic device may include at least one of type information of the message, a type of an application corresponding to the message, and a type of content included in the message.

Figure 8:
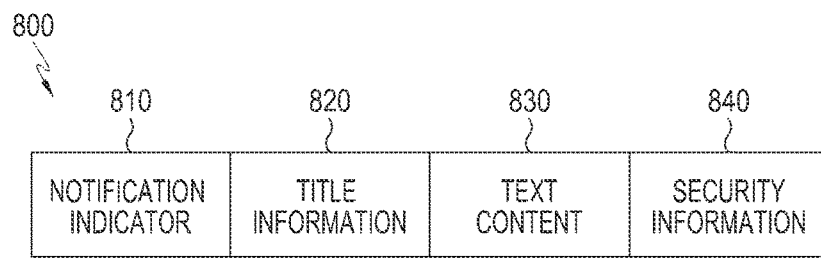
FIG. 8 illustrates notification message category information included in a notification message according to an embodiment of the present disclosure.

FIG. 6 illustrates a notification message generated in a message providing method according to an embodiment of the present disclosure. FIG. 7A illustrates message type information included in a notification message according to an embodiment of the present disclosure, and FIG. 7B illustrates message category information included in a notification message according to an embodiment of the present disclosure. FIG. 8 illustrates notification message category information included in a notification message according to an embodiment of the present disclosure.

Referring to FIGS. 6, 7A, 7B, and 8, a message 600 may include message type information 610, message category information 620, message source information 630, and message data 640. The message 600 may include a sequential number 650 used to identify and manage a message generated in the electronic device.

The message type information 610 may include information indicating a message type. For example, as illustrated in FIG. 7A, message type information 700 (e.g., 610 of FIG. 6) may include at least one of protocol version information 710, information 720 indicating a transmission type of the message, and information 730 indicating an identification type of the message. The protocol version information 710 may include a value identifying a version defined in a protocol using notification, and the information 720 indicating a transmission type of the message may include information determining whether the message is a message to be transmitted normally or a message to be transmitted urgently. The information 730 indicating an identification type of the message may include at least one of information indicating whether the message is a message issued first in an application, whether a plurality of notification messages exist in the application, or whether the message has been checked or read by the user.

The message category information 620 may include information indicating a type of a category to which the message belongs, and may store a value indicating a type of the category as illustrated in FIG. 7B.

The message source information 330 may include information indicating an object having issued the message. For example, the message source information 330 may include information indicating whether the message has been issued by a message panel provided in the electronic device or by an application provided in the electronic device.

The message data 640 may include substantial data included in the message. For example, the message data 640 may be provided in a Type, Length, Value (TLV) form. As illustrated in FIG. 8, message data 800 (640 of FIG. 6) may include a notification indicator 810 indicating generation of a message, title information 820 indicating a subject of the message, and text content 830 included in the message. The message may further include security information 840 for authenticating users of the at least one device 420, 430, and 440.

Operation 530 includes an operation of delivering the generated message to the at least one device 420, 430, and 440. If a plurality of devices are provided as the at least one device 420, 430, and 440, a plurality of messages may be sent to the plurality of devices 420, 430, and 440, respectively, in operation 530.

When transmitting the message to the at least one device 420, 430, and 440, the message may be sequentially transmitted to the at least one device 420, 430, and 440 in operation 530. For example, operation 530 may further include setting transmission priorities based on the status information of the at least one device 420, 430, and 440. Operation 530 may include sequentially transmitting messages to the at least one device 420, 430, and 440 according to the transmission priorities.

In another example, operation 530 may include transmitting a first message including information indicating generation of the message to a first device and transmitting a second message including at least one of a notification indicator indicating generation of the message, title information indicating a subject of the message, and text content included in the message to the at least one device 420, 430, and 440, upon receiving a response from the first device.

When the message is transmitted to the at least one device 420, 430, and 440, the message may be transmitted to the at least one device 420, 430, and 440 with time intervals according to an activation marker. For example, the status information of the at least one device 420, 430, and 440 is determined to identify the at least one device 420, 430, and 440 currently used by the user, and the message is delivered only to the at least one device 420, 430, and 440 that is currently used by the user. For example, if a trigger for notification is generated when a display screen of a device, such as a smart watch, among the at least one device 420, 430, and 440, is turned on and a user's input is being processed, then the message is transmitted only to the device currently used by the user, such as the smart watch.

According to another embodiment of the present disclosure, when the user currently manipulates the electronic device 410, the message may not be delivered to the at least one device 420, 430, and 440. For example, if a trigger for notification is generated when the display screen of the electronic device 410 is turned on and a user's input is currently processed, the electronic device 410 determines that the user currently manipulates the electronic device 410, and does not transmit the message.

The activation marker may be determined using the dynamic status information included in the status information. For example, the activation marker may be determined using at least one of whether there is a user input to the device, on/off statuses of the display screen, the amount of use of a CPU, a battery capacity-reducing speed, and the amount of use of a network.

The activation marker may include the frequency of use of the at least one device 420, 430, and 440. For example, the status information may be stored in a log format, based on which a context may be configured. Based on the configured context, a high priority may be allocated to a user-preferred device or a frequently used device.

The activation marker may be determined such that the notification message is not transmitted to a device which has not been used by the user for a predetermined time, despite having a higher priority, and is transmitted to a device having the next higher priority.

According to another embodiment of the present disclosure, a priority of message transmission may be determined according to a type of an application being executed on the at least one device 420, 430, and 440. For example, if the at least one device 420, 430, and 440 are devices such as an HMT, and an application associated with a game or a movie is executed, the message may be transmitted to a device having the next higher priority.

According to another embodiment of the present disclosure, a priority of transmission of a message may be determined depending on a type of content included in the message. For example, if the message received from an external electronic device has an email or a Social Network Service (SNS) message having a document format file attached thereto, the message may be transmitted after setting a priority may be set based on information such as whether the at least one device 420, 430, and 440 support execution of the attached file, a size of the display screen, and the like.

According to another embodiment of the present disclosure, the message may be transmitted by setting a priority using a type of content included in a message received from an external electronic device, information of a sender having transmitted the message, location information of the at least one device 420, 430, and 440, time information, or the like.

According to another embodiment, the message may be transmitted based on a user-set condition.

Operation 530 may include transmitting the message by using security information. For example, operation 530 may include transmitting a first message including security information authenticating a user of an electronic device to a first device (for example, a smart watch, or the like) and receiving a response with respect to user authentication from the first device. As security is released through the response with respect to user authentication from the first device, operation 530 may include transmitting a second message including at least one of an alarm indicator indicating generation of the message, title information indicating a subject of the message, and text content included in the message to the at least one device 420, 430, and 440.

The above-described user authentication may be performed using various information collected in the at least one device 420, 430, and 440. For example, the at least one device 420, 430, and 440 receive a password from the user through an input window for inputting the password and determines whether the input password is valid, thereby processing user authentication. In another example, user authentication may be performed using information collected through at least one sensors provided in the at least one device 420, 430, and 440. For example, user authentication may be processed using biometric information such as an ECG profile, a pulse pattern, a vein pattern, iris recognition, fingerprint recognition, muscle information, and the like. More specifically, user's biometric information may be registered through user's registration. In addition, a change in the biometric information of the user is tracked by continuously monitoring a body change of the user, and authentication information may be set based on the tracked biometric information change. If the device receives the first message, the device may process user authentication based on the biometric information. For example, a device of a wrist band type may obtain an ECG profile of the users and may process user authentication by comparing the collected ECG profile with a user's previously registered ECG profile.

The electronic device 410 may process message delivery by reflecting a result determined by the aforementioned user authentication. For example, if user authentication succeeds as the result of processing user authentication, the message may be provided to the at least one device 420, 430, and 440. However, if user authentication fails as the result of processing user authentication, the message may not be transmitted or a message indicating a failure in user authentication may be provided to the at least one device 420, 430, and 440. In another example, if user authentication fails as the result of processing user authentication, the message may be provided to the at least one device 420, 430, and 440 in a restricted manner. For example, the message including the notification indicator may be provided to the at least one of device 420, 430, and 440 or the message including the title information may be provided to the at least one device 420, 430, and 440.

Operations of a message providing method according to various embodiments of the present disclosure will be described with respect to FIGS. 9-12.

An operation of receiving, by an electronic device, an SMS and providing a message in response to reception of the SMS will be illustrated.

Figure 9:
FIG. 9 illustrates a message received by an electronic device in a message providing method according to an embodiment of the present disclosure.
Figure 10:
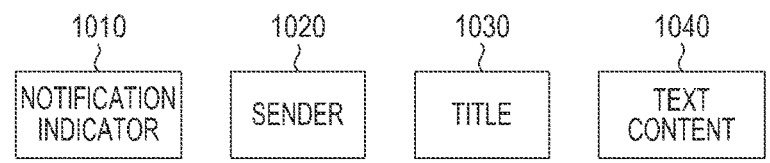
FIG. 10 illustrates notification message data generated based on a message according to an embodiment of the present disclosure.

FIG. 9 illustrates a message received by an electronic device in a message providing method according to an embodiment of the present disclosure, and FIG. 10 illustrates notification message data generated based on a message according to an embodiment of the present disclosure. FIGS. 11A, 11B, 11C, and 11D illustrate notification messages generated in a message providing method according to various embodiments of the present disclosure.

Referring to FIGS. 9, 10, and 11A-11D, the electronic device 410 performs operations of the message providing method according to various embodiments of the present disclosure upon receiving the SMS message from the external electronic device. The electronic device 410 generates an event upon receiving an SMS message from an external electronic device.

For message transmission, the electronic device 410 determines status information of the at least one device 420, 430, and 440 connected thereto.

The electronic device 410 reflects the status information of the at least one device 420, 430, and 440 to generate a message. The message may be generated depending on the status information of the at least one device 420, 430, and 440.

Figure 11A:
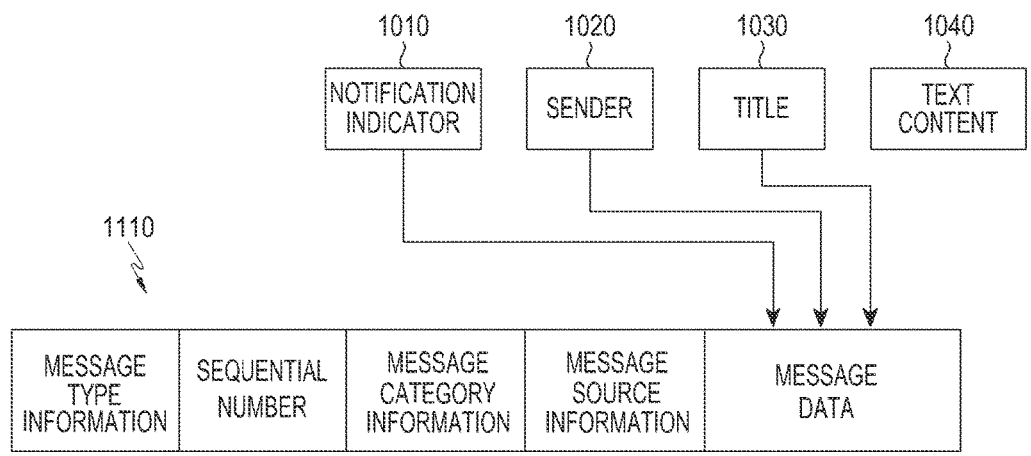
FIGS. 11A, 11B, 11C, and 11D illustrate notification messages generated in a message providing method according to various embodiments of the present disclosure.
Figure 11B:
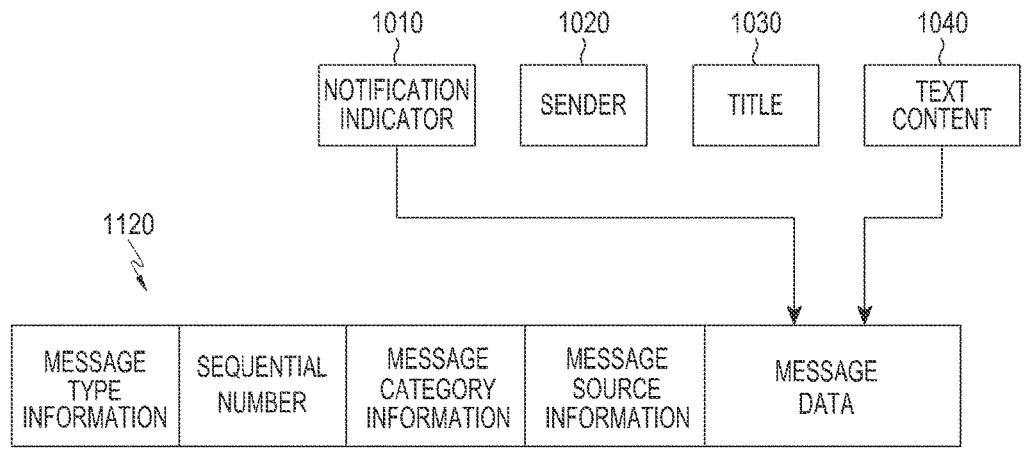
Figure 11C:
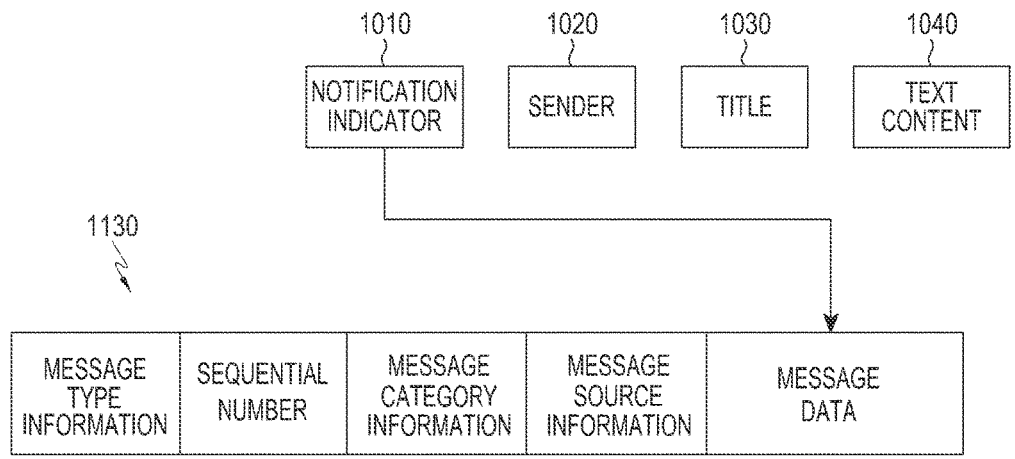

For example, as illustrated in FIG. 9, an SMS message 900 may include sender information 910, title information 920, and text content 930. In response to the SMS message 900, data to be included in a message (i.e., message data) may include at least one of a notification indicator 1010, sender information 1020, title information 1030, and text content 1040, as illustrated in FIG. 10. The information included in the message data may be selectively included in the message based on the status information of the at least one device 420, 430, and 440. For example, as illustrated in FIG. 11A, if a first device is a band-type device having a small-size display screen, a first message 1110 to be transmitted to the first device may include only some information such as the notification indicator 1010, the sender information 1020, and the title information 1030. As illustrated in FIG. 11B, if a second device is a smart-watch-type device, a second message 1120 to be transmitted to the second device may include only the notification indicator 1010 and the text content 1040. As illustrated in FIG. 11C, if a third device does not include a display, a third message 1130 to be transmitted to the third device may include only the notification indicator 1010.

Figure 11D:
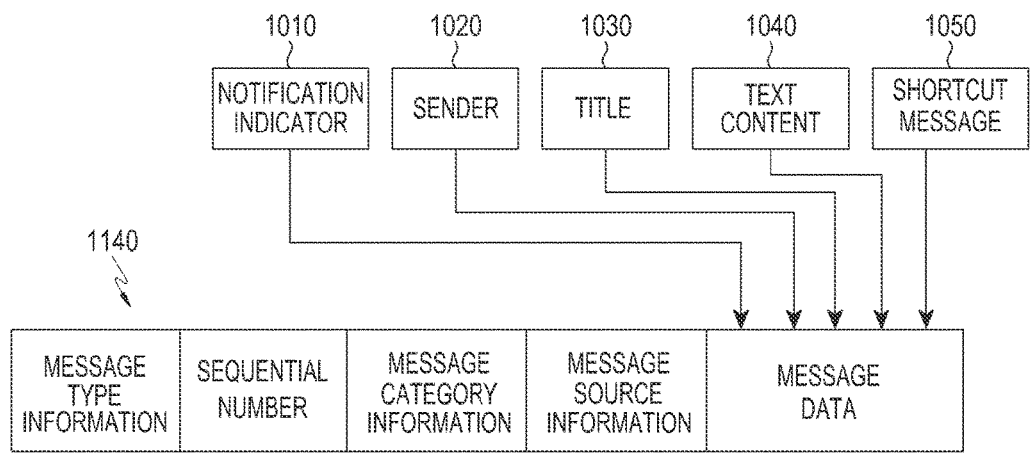

In another example, as illustrated in FIG. 11D, if a fourth device has a large-size display, a fourth message 1140 to be transmitted to the fourth device may include all of the notification indicator 1010, the sender information 1020, the title information 1030, and the text content 1040. The fourth message 1140 may include shortcut images 1050 of the sender information 1020, the title information 1030, and the text content 1040 as well as the sender information 1020, the title information 1030, and the text content 1040 in a text format.

Moreover, a message providing method according to various embodiments of the present disclosure may generate and transmit a security-set message.

Figure 12A:
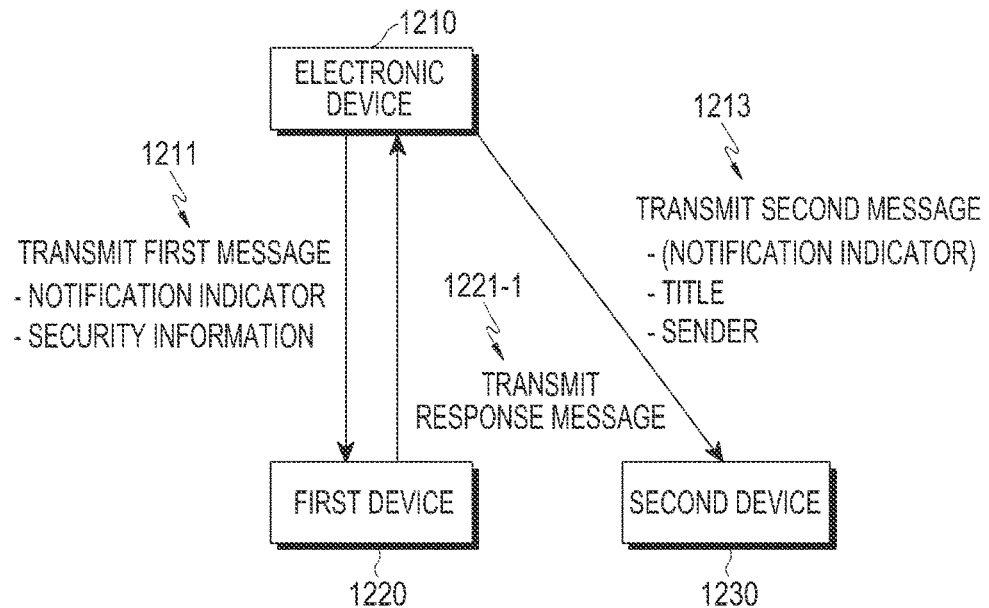
FIGS. 12A, 12B, and 12C are conceptual diagrams illustrating generation and transmission of a security-set notification message in a message providing method according to various embodiments of the present disclosure.
Figure 12B:
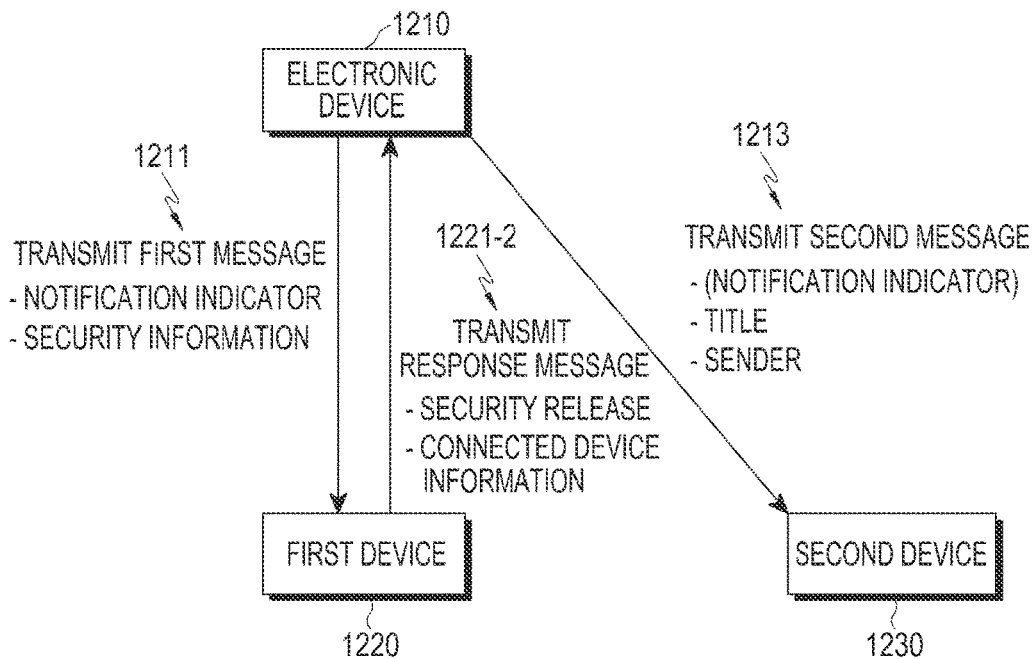
Figure 12C:
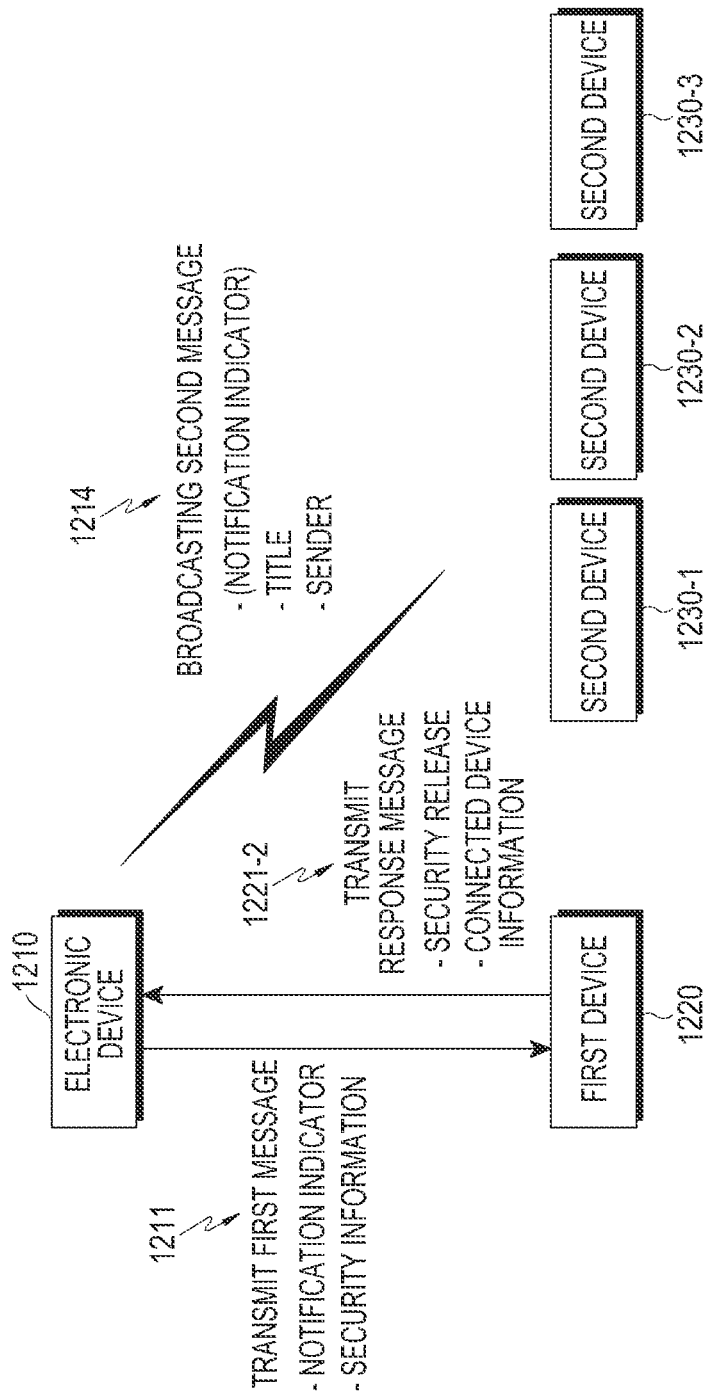

FIGS. 12A to 12C are conceptual diagrams illustrating generation and transmission of a security-set notification message in a message providing method according to various embodiments of the present disclosure.

Referring to FIG. 12A, an electronic device 1210 transmits a first message for security authentication to a first device 1220 in operation 1211. The first message may include a notification indicator and security information. The first device 1220, upon receiving the first message, determines that the first message has been received, and performs user authentication according to the transmitted security information. The user authentication may include generating and displaying an input window for inputting information for authentication (e.g., a password) through a display and receiving the information for authentication from the user. In another example, the user authentication may include performing user authentication by using biometric information stored in advance by the first device 1220 or collected in real time from the user. Once the user authentication is completed, the first device 1220 transmits a response message to the first message to the electronic device 1210 in operation 1221-1. The response message may include information indicating that security authentication is approved or rejected through the user authentication. The electronic device 1210 generates a second message based on the information included in the response message and transmits the generated second message to a second device 1230 in operation 1213. The second message may include at least one of a notification indicator, sender information, title information, and text content.

Referring to FIG. 12B, the electronic device 1210 transmits a first message for security authentication to the first device 1220 in operation 1211. The first message may include a notification indicator and security information. The first device 1220, upon receiving the first message, determines that the first message has been received, and performs user authentication according to the received security information. The user authentication may include generating and displaying an input window for user's inputting information for authentication (for example, a password) through a display and receiving the information for authentication from the user. In another example, the user authentication may include performing user authentication by using biometric information stored in advance by the first device 1220 or collected in real time from the user. The user authentication may further include receiving information about a device that is to transmit the message. The first message may include a list of at least one device connected with the electronic device 1210. The first device 1220 generates and displays an input window for selecting a device having transmitted a notification message to the user through a display based on the list of the at least one connected devices, and receiving information about the device having transmitted the message from the user.

Once the user authentication is completed, the first device 1220 transmits a response message with respect to the first message to the electronic device 1210, in operation 1221-2. The response message may include information indicating that security authentication is approved or rejected through the user authentication and information indicating a device (information indicating a device that is to transmit the notification message). The electronic device 1210 generates the second message based on the information included in the response message. The electronic device 1210 sets the second device 1230 based on the information indicating the device, which is included in the response message, and transmits the second message to the second device 1230, in operation 1213. The second message may include at least one of a notification indicator, sender information, title information, and text content.

Referring to FIG. 12C, the electronic device 1210 transmits the first message for security authentication to the first device 1220 in operation 1211. The first message may include the notification indicator and the security information. The first device 1220, upon receiving the first message, determines that the first message has been received, and performs user authentication according to the received security information. The user authentication may include generating and displaying an input window for inputting information for authentication (e.g., a password) through a display and receiving the information for authentication from the user. In another example, the user authentication may include performing user authentication by using biometric information that is stored in advance by the first device 1220 or collected in real time from the user.

Once the user authentication is completed, the first device 1220 transmits a response message with respect to the first message to the electronic device 1210 in operation 1221-2. The response message may include information indicating that security authentication is approved or rejected through the user authentication. The electronic device 1210 generates the second message based on the information included in the response message and broadcasts the generated second message to at least one second devices 1230-1, 1230-2, and 1230-3 in operation 1214. The second message may include at least one of a notification indicator, sender information, title information, and text content.

An electronic device and at least one device may be generally connected using a local network such as Bluetooth. However, due to a limitation of a communication coverage based on the local network such as Bluetooth, if the electronic device and the at least one device travel more than a predetermined distance away from each other, network connection may be terminated. As such, the electronic device and the at least one device are not connected through communication and the electronic device may not be able to transmit a message to the at least one device. Therefore, there is a need for a scheme capable of transmitting, by the electronic device, the notification message, to the at least one device, even when the electronic device and the at least one device are not connected over the local network such as Bluetooth.

A method for of transmitting, by the electronic device, the notification message, to the at least one device, even when the electronic device and the at least one device are not connected over the local network such as Bluetooth, is described below.

Figure 13:
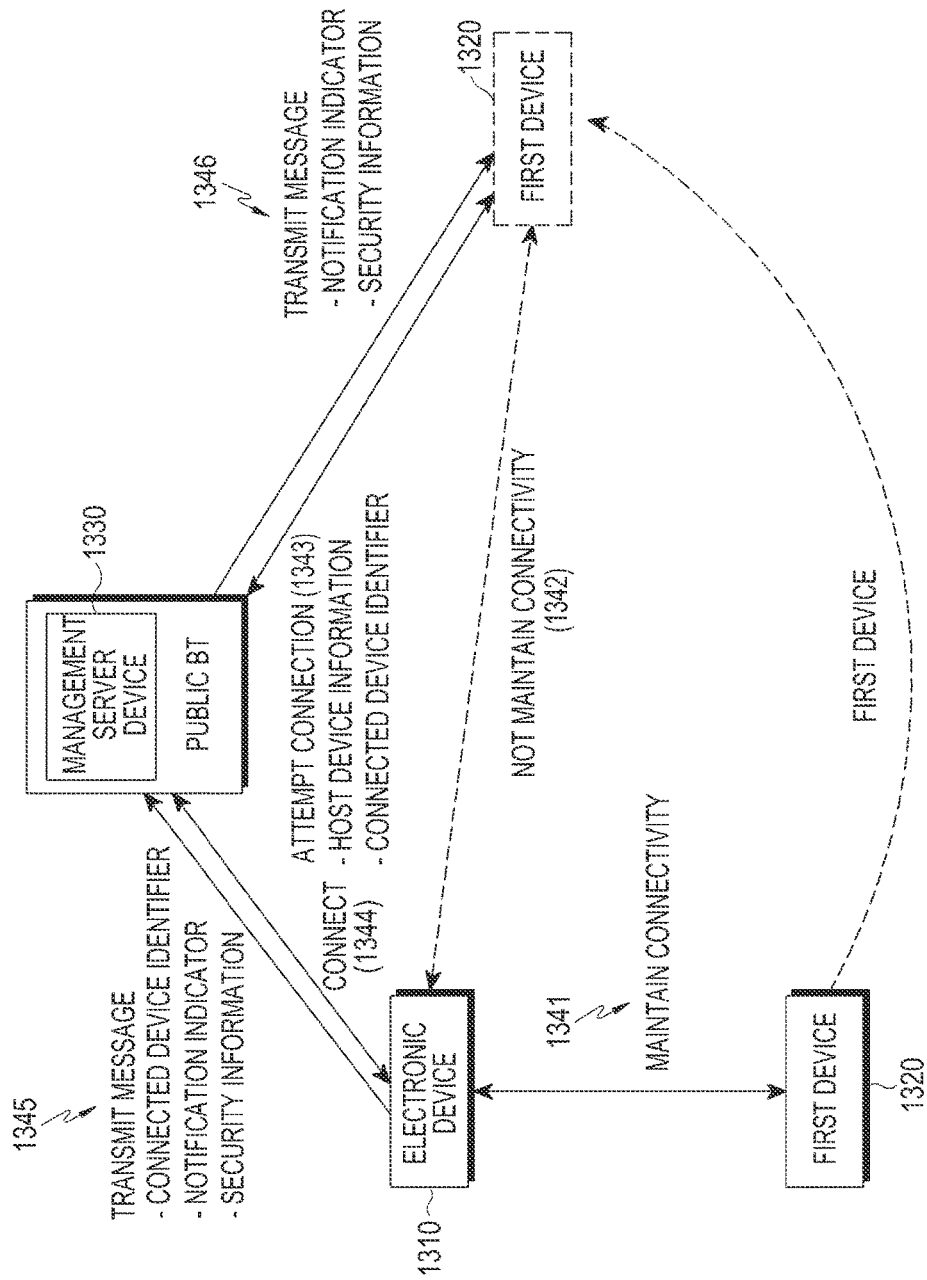
FIG. 13 is a conceptual diagram illustrating another example of a message providing method according to an embodiment of the present disclosure.

FIG. 13 is a conceptual diagram illustrating another example of a message providing method according to an embodiment of the present disclosure.

Referring to FIG. 13, an electronic device 1310 maintains a connection with a first device 1320 by using a predetermined communication method (e.g., a local network such as Bluetooth) in operation 1341. As the electronic device 1310 or the first device 1320 moves to another region, connection between the electronic device 1310 and the first device 1320 may be terminated in operation 1342. Thus, the first device 1320 searches for a public network for connection in operation 1343. For example, the public network may include public Bluetooth, public Wi-Fi, and the like. By using public Bluetooth, any BT devices may be automatically connected without authentication, and a management server device 1330 for managing a public BT service (e.g., a manufacturer, a service provider server, or the like) may be connected. The first device 1320 transmits information for identifying the first device 1320 to the management server device 1330 through the connected public BT network. The information for identifying the first device 1320 may include a MAC address or a Device ID. The first device 1320 transmits information (e.g., an International Mobile Equipment Identity (IMEI), an IMSI, a call number, or the like) for identifying the electronic device 1310 to the management server device 1330 over the connected public BT network.

The management server device 1330 connects the electronic device 1310 connected with the first device 1320 over the public BT network by using the provided information.

As the first device 1320 and the electronic device 1310 are connected over the public BT network in operation 1344, the electronic device 1310 transmits a message over the public BT network. For example, the electronic device 1310 transmits a message to the management server device 1330 of the public BT network in operation 1345, and the management server device 1330 delivers the message to the first device 1320 in operation 1346. The message transmitted in this process may include information illustrated in the message providing method according to various embodiments of the present disclosure. The message may include only the notification indicator. In another example, the electronic device 1310 selectively transmits the message guaranteeing user's privacy to the first device 1320. For example, the electronic device 1310 may transmit a message corresponding to a low battery or call/message reception among triggers with respect to various notifications to the first device 1320. Moreover, the message transmitted by the electronic device 1310 to the first device 1320 may be determined by user's setting. For example, the user may set a level of a notification message that may be transmitted over the public network or may directly set a type of a message that may be transmitted over the public network.

Figure 14:
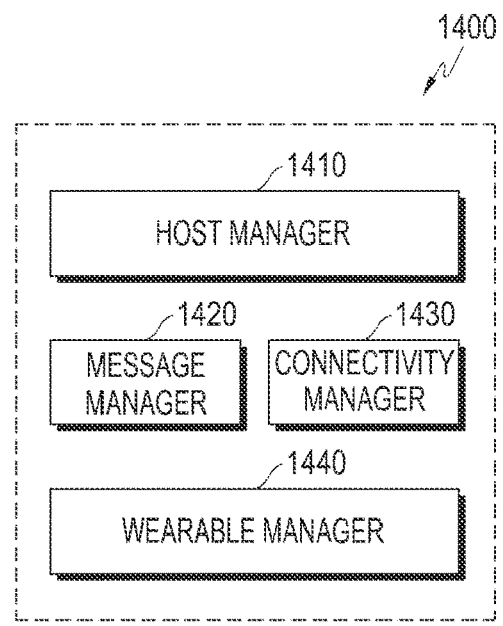
FIG. 14 is a block diagram of an electronic device to which a message providing method according to an embodiment of the present disclosure.

FIG. 14 is a block diagram of an electronic device to which a message providing method according to an embodiment of the present disclosure is applied.

Referring to FIG. 14, an electronic device 1400 (e.g., 410 of FIG. 1) to which a message providing method according to various embodiments of the present disclosure is applied may include a host manager 1410, a message manager 1420, and a connectivity manager 1430. The electronic device 1400 may further include a wearable manager 1440. The wearable manager 1440 may process data management, multi-connection, retransmission, and file transfer, and may manage and control transmission and reception of packet data between an electronic device and a device.

The host manager 1410 is a module for directly managing at least one device connected to the electronic device 1400, and may include a status management unit, a backup/restore unit, a package management unit, and a setup management unit.

The status management unit may collect, store, and manage status information of the electronic device 1400 and the at least one device. The status information may include static status information or dynamic status information. The static information may be is information collected and stored during establishment of connection with the at least one device 420, 430, and 440 or collected at the request of the user. The static information may include information that is allocated to a device and does not change. For example, the static information may include at least one of DeviceID information, DeviceName information, Platform information, AppList information, AppVersion information, Connectivity information, ProvidingFeature (or RequiredFeature) information, Security information, Noti. Level information, AppFeature information, P/C Peer-to-peer information, P/C authentication method information, H/W information, available sensor information, supported file format information, and the like.

The DeviceID information may include information for identifying a connected device. For example, DeviceID may include a MAC address of the connected device.

The DeviceName information may include a name of a device designated or input by the user.

The Platform information may include information indicating a type of a platform applied to the device. The Platform information may include characteristic information of the device as well as information about an OS.

The AppList information may include information indicating a list of applications installed in the device.

The AppVersion information may include information indicating a version of an application installed in the device.

The Connectivity information may include information indicating a device-specific supportable communication scheme.

The ProvidingFeature (or RequiredFeature) information may include information indicating a function corresponding to a role between the electronic device and the device.

The Security information may include information indicating a security level defined in the device.

The Noti. Level information may include information indicating a level in which the device may receive a message.

The AppFeature information may include information indicating a main function for each version of an application. The AppFeature information may be used to determine compatibility of applications provided in the electronic device and the device.

The P/C Peer-to-peer information may include information indicating a device's connection scheme.

The P/C authentication scheme information may include information indicating a scheme in which a device performs authentication.

The dynamic status information may include information that may change dynamically in the device. For example, the dynamic status information may include information indicating whether the device is currently driven, information about an application currently executed by the device, information about an application that stands by in a background, a CPU operation status, a screen control status, a battery status, a network status, sensor-collected information, and the like.

The backup/restore unit manages data stored/managed in an application installed in the at least one device. To this end, an API for performing backup/restore operations may be provided in a separate application installed in the at least one device. The backup/restore unit manages a size of an application-specific or application-common processable memory.

The package management unit installs, updates, or deletes an application package provided in the electronic device 1400. The package management unit installs and deletes data of an application and data of a backed-up application.

The setup management unit processes initial connection with the at least one device. The setup information generated in each application provided in the at least one device may be configured by an application and provided to the setup management unit, and the setup management unit may store setup information of an application for the at least one device.

The host manager 1401 controls the at least one device. The host manager 1410 may process interaction with the user through a host management application.

FIGS. 15A to 15E illustrate examples of a host management application User Interface (UI) used in an electronic device to which a message providing method is applied according to various embodiments of the present disclosure.

Figure 15A:
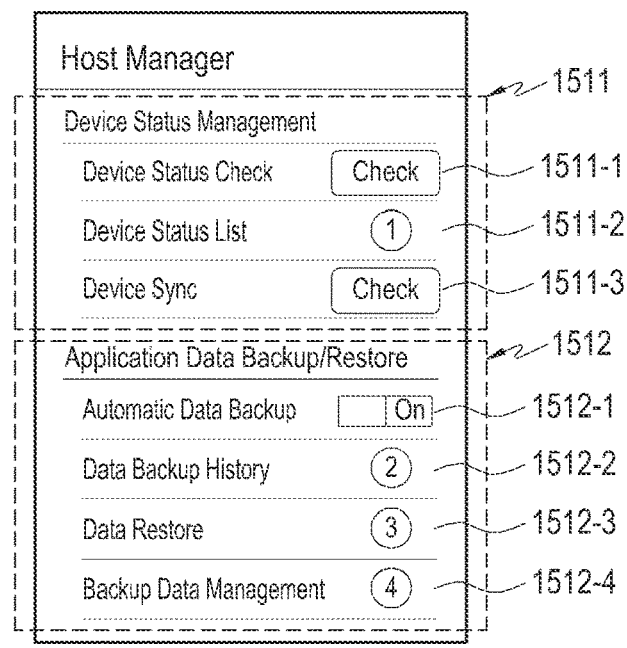
FIGS. 15A, 15B, 15C, 15D, and 15E illustrate examples of a host management application User Interface (UI) used in an electronic device to which a message providing method according to various embodiments of the present disclosure.

Referring to FIGS. 15A-15E, the host management application UI may include a main UI 1510 illustrated in FIG. 15A. The main UI 1510 may include a first menu 1511 capable of performing status management and a second menu 1512 capable of performing backup/restore operations.

Figure 15B:
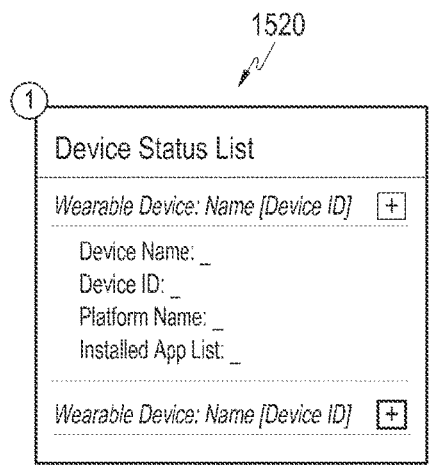

The first menu 1511 may include a device status determination menu 1511-1, a device status list menu 1511-2, and a device synchronization menu 1511-3. The device status determination menu 1511-1 is a menu for requesting determination of the status information of at least one device connected to the electronic device 1400. As the user selects the device status determination menu 1511-1, an operation of determining the status information of the at least one device is requested. The device status list menu 1511-2 is a menu for providing a list of the status information of the at least one device, and as the user selects the device status list menu 1511-2, a sub menu 1520 providing the list of the status information of the at least one device is activated as illustrated in FIG. 15B. The sub menu 1520 provides the status information differently for the at least one device. The device synchronization menu 1511-3 may be a menu for providing sharing of updated information with a peripheral device.

Figure 15C:
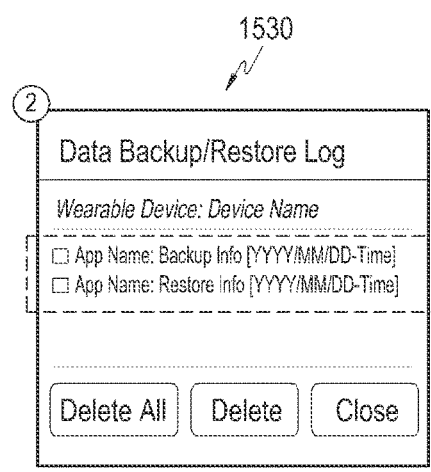
Figure 15D:
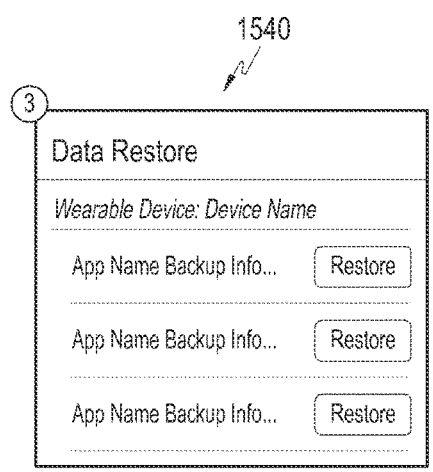
Figure 15E:
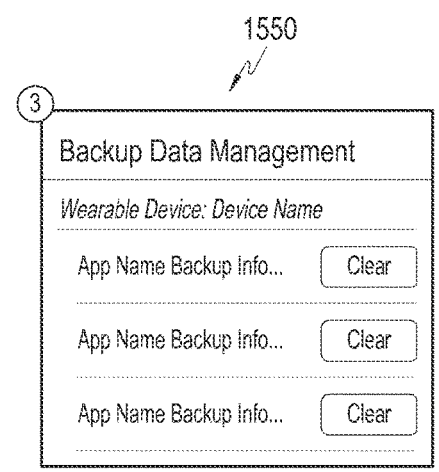

The second menu 1512 may include a data backup auto-setting menu 1512-1, a data backup history menu 1512-2, a data restore menu 1512-3, and a backup data management menu 1512-4. The data backup auto-setting menu 1512-1 is a menu for setting auto data backup to determine whether to automatically or manually perform data backup. The data backup history menu 1512-2 is a menu for providing log information of data backup. Once the data backup history menu 1512-2 is selected by the user, a sub menu 1530 for providing log information of data backup may be provided as illustrated in FIG. 15C. The sub menu 1530 may provide a data backup history which may be provided for each of the at least one device connected to the electronic device. The sub menu 1530 may provide a menu for deleting at least one backup logs included in the data backup history. The data restore menu 1512-3 may be connected with a sub menu 1540 capable of restoring backup data as illustrated in FIG. 15D. Once the data restore menu 1512-3 is selected by the user, the sub menu 1540 may be activated. The sub menu 1540 provides a list of backed-up applications, and provides a menu for restoring backup data for an application selected by the user from the list. The data restore menu 1512-3 provides a list of backed-up applications differently for the at least one device. The backup data management menu 1512-4 is a menu for managing backup data. Once the backup data management menu 1512-4 is selected by the user, a sub menu 1550 capable of managing backup data may be provided as illustrated in FIG. 15E. The sub menu 1550 provides a list of backed-up applications, and provides a menu capable of managing (for example, deleting) backup data for an application selected by the user from the list. The data restore menu 1512-3 provides a list of backed-up applications differently for the at least one device.

The second menu 1512 may store and restore information regarding an application file, APP data, a configuration, and the like, and may also store time information, and thus may be used for previous task restoration and reservation. As a space for backup/restore operations, a repository is used, and attributes such as Device ID, Device Name, App ID, App Version, and the like may be used for management of backup data stored in the repository. Based on information extracted from the repository, data transfer, application driving, and the like may be possible.

The package management unit may provide a package management UI for installing, updating, or deleting an application package provided in the electronic device 1400.

Figure 16:
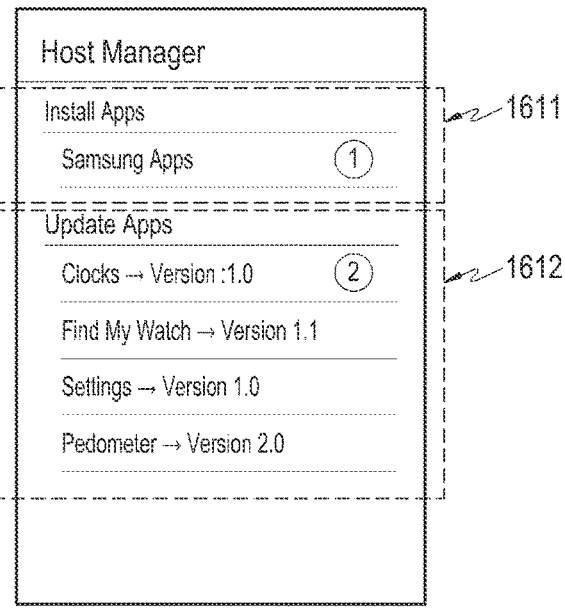
FIG. 16 illustrates a package management UI used in an electronic device to which a message providing method according to various embodiments of the present disclosure.

FIG. 16 illustrates a package management UI used in an electronic device to which a message providing method is applied according to an embodiment of the present disclosure.

Referring to FIG. 16, the package management UI may include a first menu 1611 for installing an application package and a second menu 1612 for updating an application package. When the first menu 1611 is selected by the user, the package management UI may connect to a content providing server capable of selecting and downloading content including an application or display a page provided for the content providing server to select and download the content. When the second menu 1612 is selected by the user, a page providing update of an application package may be displayed.

The package management unit may be provided to install an application suitable for a type in a multi-device environment, based on capability list information or internal XML information. An electronic device may maintain installation of an application corresponding to a device, by referring to information about a peripheral device from the electronic device or an external storage device. For example, the internal XML information may include a file regarding application information existing in a device, and the capability list information may include items necessary for management of status information of the electronic device and the device and may be used in capability negotiation for guaranteeing backward compatibility between a provider and a consumer.

The connectivity manager 1430 may provide a connectivity management UI capable of managing connection with at least one device to the electronic device 1400.

Figure 17:
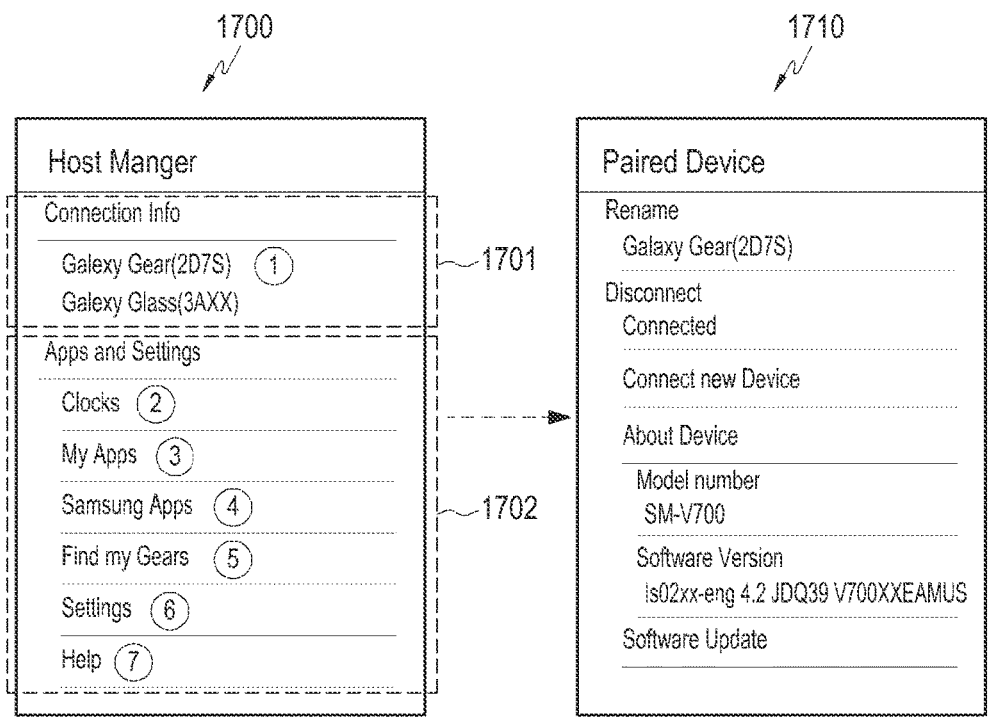
FIG. 17 illustrates a connection management UI used in an electronic device to which a message providing method according to an embodiment of the present disclosure.
Figure 18A:
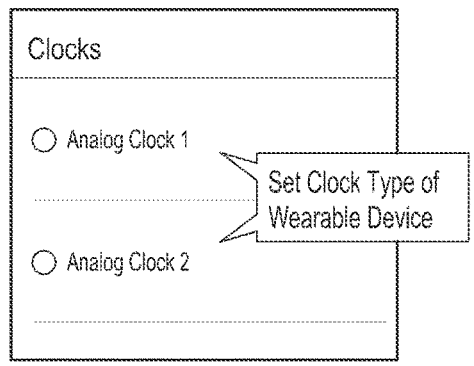
FIGS. 18A, 18B, 18C, 18D, and 18E illustrate sub menus of a connection management UI used in an electronic device to which a message providing method according to various embodiments of the present disclosure.
Figure 18B:
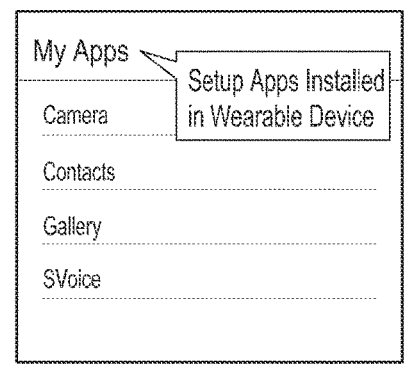
Figure 18C:
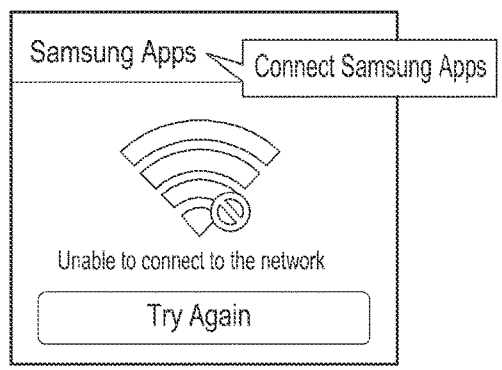
Figure 18D:
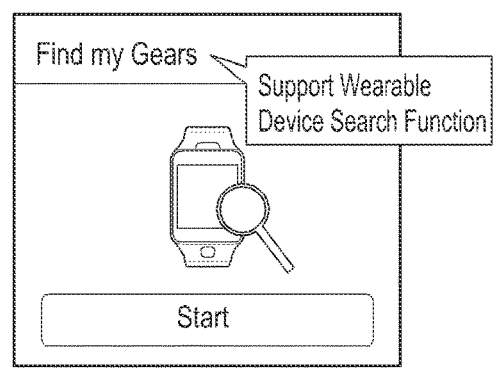
Figure 18E:
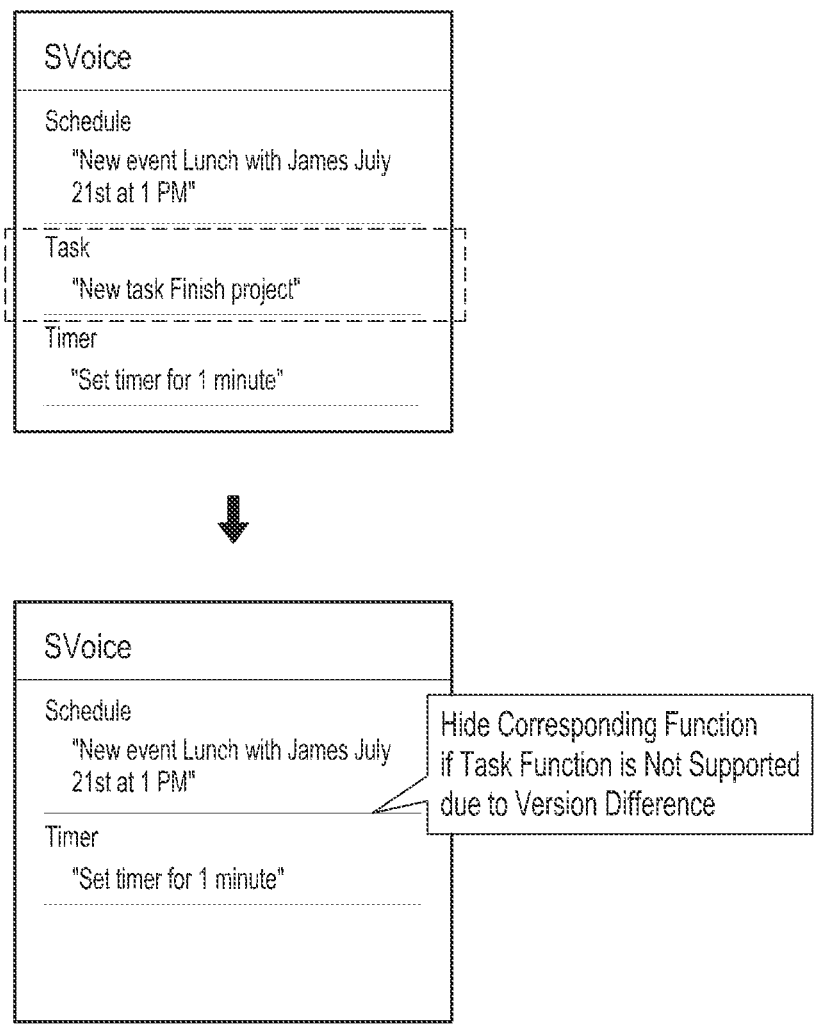

FIG. 17 illustrates a connection management UI used in an electronic device to which a message providing method is applied according to an embodiment of the present disclosure. FIGS. 18A, 18B, 18C, 18D, and 18E illustrate sub menus of a connection management UI used in an electronic device to which a message providing method is applied according to various embodiments of the present disclosure.

Referring to FIGS. 17 and 18A-18E, a connection management UI 1700 may include a connectivity information menu 1701 including a device list of at least one device connected to the electronic device and a connected-device management menu 1702 capable of managing setting of the at least one connected devices.

When the device list included in the connectivity information menu 1701 is selected, a sub menu 1710 for providing detailed connectivity information regarding a corresponding device may be provided. The sub menu 1710 may include the detailed connectivity information regarding the device, for example, a name of a connected device, a version of operating software installed in the device, and update information of the operating software installed in the device. The sub menu 1710 may include a menu for processing an operation such as modifying the name of the connected device or terminating connection of the connected device.

The connected-device management menu 1702 may provide a sub menu for setting an individual application selected and installed by the user, as well as a default application (for example, a clock application) installed in advance in the device. Examples of the sub menu may be as illustrated in FIGS. 18A to 18E.

The setup management unit may provide a setup information management UI capable of managing setup information generated in each application provided in the at least one device.

Figure 19:
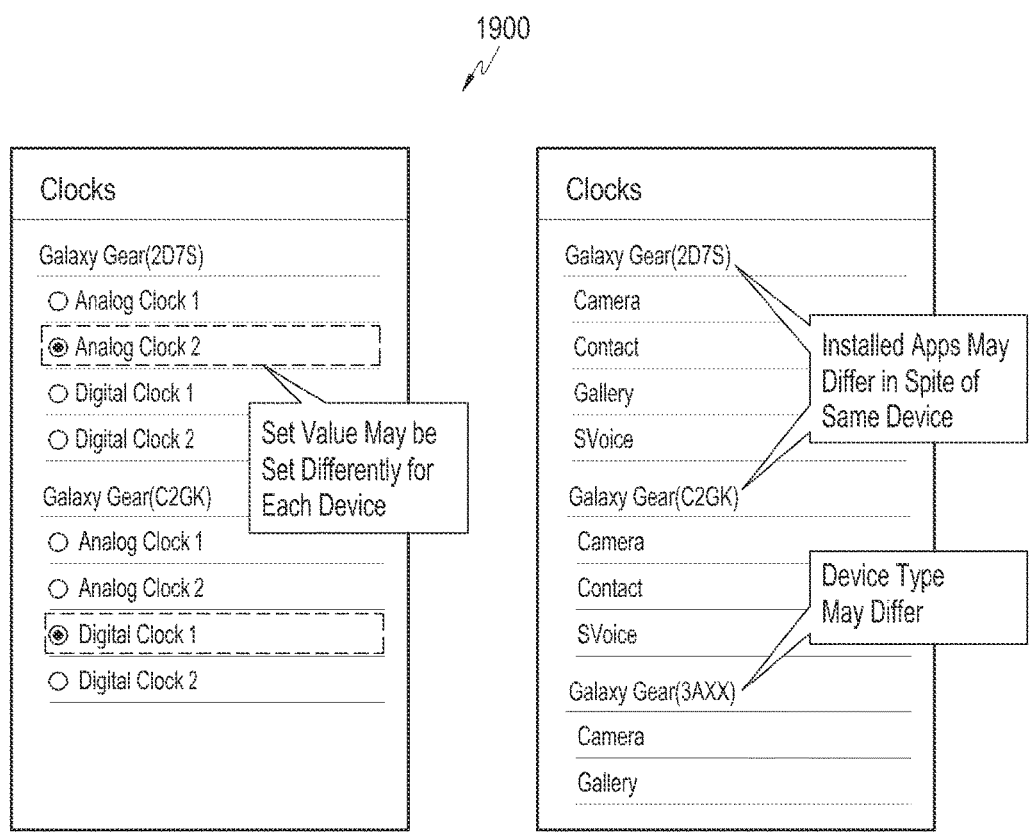
FIG. 19 illustrates a setup information management UI used in an electronic device to which a message providing method according to an embodiment of the present disclosure.

FIG. 19 illustrates a setup information management UI used in an electronic device to which a message providing method is applied according to an embodiment of the present disclosure.

Referring to FIG. 19, a setup information management UI 1900 may include a menu for independently managing setting of an application installed in a device.

The message manager 1420 performs the operation of transmitting a trigger for notification generated in the electronic device to a device.

The trigger for notification may be generated when an application provided in the electronic device 410 is driven and generates a message having a notification function, or may be generated as a message is received from an external electronic device. A method for transmitting the trigger for notification may include a forward notification method and a backward notification method. The forward notification method may include delivering information shown on a status bar or a notification panel to at least one device. For example, the forward notification method may be used to transmit notification generated in an application such as a G-mail, Facebook, or instant messaging application.

The backward notification method may be used to deliver device details information collected or generated by a device for transmission to an electronic device.

The message manager 1420 performs the forward notification method for delivering the notification event occurring in the electronic device to the device and a notification synchronization (sync) operation for, upon receiving, by the electronic device, the notification event determined in the device, transmitting the received notification event to another device. The notification sync operation may be understood as a hybrid process of receiving a notification message based on the backward notification method and then performing the forward notification method for delivering corresponding information to another electronic device. The message manager 1102 may perform packet transmission and reception by using a wearable platform, and may obtain connectivity information from the connectivity manager 1103 when configuring a notification message packet.

The message manager 1420 selectively sends a notification message according to a preset notification level of a device and an application. The notification level may be set considering a size of a notification message packet or content included in the notification message.

The message manager 1420 sends the notification message according to a priority. The priority may be set based on a device or an application. The priority set based on the device may be determined according to a type of the device or user setting. The priority set based on the device may be determined considering status information of a device managed by the host manager 1410. The status information of the device may include dynamic status information and static status information. If the priority is set using the dynamic status information, the priority may dynamically change with the status information of the device. If the device is connected again with the electronic device after termination of the connection, the message manager 1420 sends a message that has not been sent, until the device is connected again with the electronic device after termination of the connection.

Figure 20:
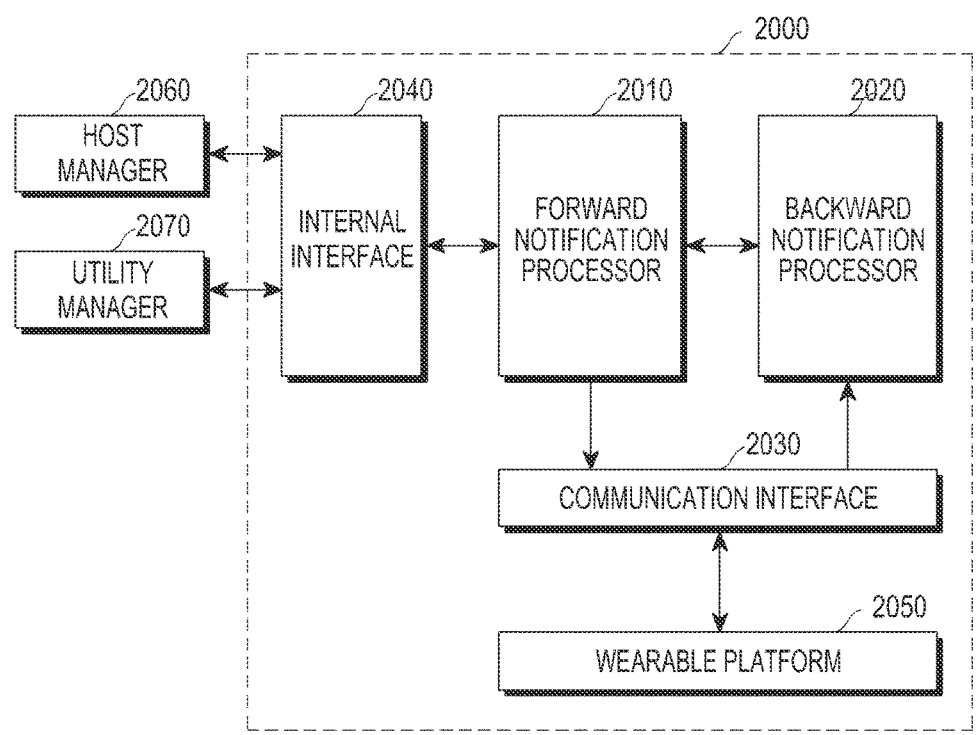
FIG. 20 is a block diagram of a message manager included in an electronic device to which a message providing method according to an embodiment of the present disclosure is applied.

FIG. 20 is a block diagram of a message manager included in an electronic device to which a message providing method according to an embodiment of the present disclosure.

Referring to FIG. 20, the message manager 2000 may include a forward notification processor 2010, a backward notification processor 2020, a communication interface 2030, an internal interface 2040, and a wearable platform 2050. At least one function units provided in the message manager 2000 may be connected to a host manager 2060 or a utility manager 2070 through the internal interface 2040.

Upon occurrence of a notification event, the forward notification processor 2010 determines content to be included in a message. To generate the message including the content, the forward notification processor 2010 determines status information of a device. By reflecting the status information, the forward notification processor 2010 generates the message.

The status information may include static status information or dynamic status information. The static status information is information collected and stored during establishment of connection with at least one device or collected at the request of the user. The static status information may include information that is allocated to a device and does not change. For example, the static status information may include at least one of DeviceID information, DeviceName information, Platform information, AppList information, AppVersion information, Connectivity information, ProvidingFeature (or RequiredFeature) information, Security information, Noti. Level information, AppFeature information, P/C Peer-to-peer information, P/C authentication method information, H/W information, available sensor information, supported file format information, and the like.

The forward notification processor 2010 may generate the message by reconfiguring a notification message adaptively for the status information. For example, the forward notification processor 2010 may reconfigure the message to deliver only essential information such as title or sender information of an email to a band-type device having a limitation in a screen and to deliver text content of the email to a smart watch-type device.

If a plurality of devices are provided as the at least one device, a plurality of messages may be generated. The operation of generating a message may include generating a first message based on status information of the first device and generating a second message based on status information of the second device.

The message generated by the forward notification processor 2010 may include message type information, message category information, message source information, and message data. The message may include a sequential number used to identify and manage a message generated in the electronic device.

The forward notification processor 2010 delivers the generated message to the wearable platform 2050 through the communication interface 2030, and the wearable platform 2050 generates and transmits a data packet for transmission to the device.

The device receiving the message provides the message to the user through a display, and then sends a response message to the electronic device according to a user input. The response message is delivered to the backward notification processor 2020 through the wearable platform 2050 and the communication interface 2030. Thus, the backward notification processor 2020 may check the response message.

The response message may include information indicating that the user has checked the message or user authentication result information determined based on security information included in the message. If the response message includes the information indicating that the user has checked the message, the information indicating that the user has checked the message may be delivered to the backward notification processor 2020 or the forward notification processor 2010. The forward notification processor 2010 may deliver information indicating that the user has checked the message to other devices connected to the electronic device. In another example, if the response message includes the user authentication result information determined based on security information included in the message, the backward notification processor 2020 determines the information included in the response message to determine whether user authentication succeeds or fails. If the user authentication succeeds, then the backward notification processor 2020 delivers information indicating that the user authentication succeeds to the forward notification processor 2010 which then sends a notification message to other devices connected to the electronic device. On the other hand, if user authentication fails, then the backward notification processor 2020 delivers information indicating that the user authentication fails to the forward notification processor 2010 which then does not transmit the message to other devices connected to the electronic device or generates a message including information indicating that the user authentication fails and transmits the generated message to other devices connected to the electronic device.

Depending on setting or a status of a device, message transmission from an electronic device may be blocked. If a message is generated in the transmission-blocked status, the message may be stored in the electronic device or the device. The stored message may be provided to the user when setting of the electronic device or the device is changed. For example, a message which has been checked by the user and a message which has not been checked by the user may be differently provided, or only the non-checked message may be provided.

The connectivity manager 1430 is a module for managing connection of a network service, and may process a function such as discovery/pairing, auto-connection, recovery, or the like. The connectivity manager 1430 may provide connectivity information (for example, connection establishment, connection release, status information, status change, and so forth) of the electronic device and the at least one device to an application. The connectivity manager 1430 may provide connectivity attributes of the at least one device to the message manager 1420.

The connectivity manager 1430 provides a list of devices connectable with the electronic device and provides connectivity capability for each device, during discovery/pairing. The connectivity manager 1403 may also provide device's connectable physical information (for example, BLE, BT3.0, BT4.0, BT4.1 . . . ) and the number of devices. The connectivity manager 1430 may process pairing with the electronic device by using security level information that is set in the device, during discovery/pairing.

If connection with the device is terminated due to the auto-connection function regardless of user's intention, the connectivity manager 1430 provides re-connection with the device and also provides auto-connection with the device on a layer basis. If at least one device simultaneously attempts connection to the electronic device, the connectivity manager 1430 may control connection, such that the at least one device is connected in a sequential manner or in a priority-based manner.

The electronic device may further include a utility processor for processing a utility function. The utility processor may process data compression, encoding, and authentication to provide a message. The utility processor may also process a security-associated function. A device connected to an electronic device may be set to be available only in authenticated (approved) device and application. To this end, a stepwise protection action corresponding to a communication channel or a security level set in a device may be taken. This security function may be generated by including information for authentication or forgery prevention in a notification message. To process the security function, a device-specific authentication-associated service and an encrypted data transmission service using the device-specific authentication-associated service may be provided when a message is delivered. An encryption function for data communication protection of an application may also be provided, and in this case, an encryption key may be generated and transmitted for each application. Various functions associated with security may be set by the utility process in connection with the device. For example, in connection with the device, a security level may be provided and based on the security level, a security function of the device may be set.

According to an embodiment of the present disclosure, a method for transmitting a message to at least one device by an electronic device may include determining status information of at least one device connected with the electronic device, generating a message, taking the status information of the at least one device into account, and transmitting the message to the at least one device.

According to an embodiment of the present disclosure, the determining of the status information of the at least one device may be processed based on a notification event generated in the electronic device or a received message including first content.

According to an embodiment of the present disclosure, the status information may include at least one of hardware information, OS information, application installation information, security information, and function information of the device, information indicating whether the device is currently used, information about an application that is currently executed in the device, hardware operation status information, a battery status, a network status, and sensor-collected information.

According to an embodiment of the present disclosure, the generating of the message may include selecting at least one of the at least one device, taking the status information of the at least one device into account.

According to an embodiment of the present disclosure, the generating of the message may include selecting at least one of the at least one device, taking information included in the received message into account.

According to an embodiment of the present disclosure, the first message may include at least one of type information of the first message, a type of an application corresponding to the first message, and a type of the first content.

According to an embodiment of the present disclosure, the at least one device may include a first device and a second device, and the generating of the message may include generating a first message based on status information of the first device and generating a second message based on status information of the second device.

According to an embodiment of the present disclosure, the transmitting of the message to the at least one device may include determining priorities of the at least one device, taking the status information of the at least one device into account, and transmitting the message to the at least one device sequentially according to the priorities.

According to an embodiment of the present disclosure, the message may include a notification message.

According to an embodiment of the present disclosure, the notification message may include a notification indicator indicating generation of the notification message, title information indicating a title of the notification message, and text content included in the notification message.

According to an embodiment of the present disclosure, the notification message may include security information for authenticating a user of the connected device.

According to an embodiment of the present disclosure, the transmitting of the message to the at least one device may include determining authentication information based on a first message including security information for authenticating a user of the electronic device, and transmitting a second message including at least one of the notification indicator indicating generation of the message, title information indicating a title of the notification message, and text content included in the notification message to at least one second devices.

According to an embodiment of the present disclosure, the transmitting of the message to the at least one device may include determining authentication information based on a first message including information indicating generation of the message and transmitting a second message including at least one of title information indicating a title of the notification message and text content included in the notification message to at least one second devices.

According to an embodiment of the present disclosure, the method may further include providing the second message to the first device.

According to an embodiment of the present disclosure, a notification message may be effectively provided to various auxiliary devices connected to an electronic device.

In addition, by using various auxiliary devices connected to an electronic device, a security-maintained notification message may be effectively provided.

Furthermore, a notification message may be provided by efficiently distributing transmission data to various auxiliary devices connected to an electronic device.

Other effects that may be obtained or expected from the embodiments of the present disclosure are explicitly or implicitly disclosed in the detailed description of the embodiment of the present disclosure. For example, various effects expected from the embodiments of the present disclosure have been disclosed in the detailed description of the present disclosure.

The embodiments of the present disclosure provided in the present specification and the drawings merely provide particular examples to easily describe the technical contents of the present disclosure and to facilitate understanding of the present disclosure, rather than to limit the scope of the embodiments of the present disclosure. Thus, the scope of the embodiments of the present disclosure should be construed as including any changes or modifications derived from the technical spirit of the embodiments of the present disclosure as well as the embodiments described herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting a message by an electronic device, the method comprising:
   identifying a message generated by an application in the electronic device;
   identifying capabilities and attributes of a first external device and a second external device connected with the electronic device in response to the message generated by the application;
   generating a first message including a first part of the message based on a capability and an attribute of a first display of the first external device;
   generating a second message including a second part of the message based on a capability and an attribute of a second display of the second external device, the second part of the message being different from the first part of the message; and
   transmitting the first message and the second message to the first external device and the second external device, respectively,
   wherein, when a size of the first display is larger than a size of the second display, an amount of the first part of the message is greater than an amount of the second part of the message.

2. The method of claim 1, further comprising:
   identifying a received message received from outside.

3. The method of claim 2, further comprising:
   selecting the first external device and the second external device among a plurality of external devices based on information included in the received message.

4. The method of claim 3, wherein the message comprises at least one of type information of the message, a type of an application corresponding to the message, or a type of the first content.

5. The method of claim 1, wherein the capability and the attribute of the first external device includes first status information, the first status information comprises at least one of hardware information, Operating System (OS) information, application installation information, security information, function information of the first external device, information indicating whether the first external device is currently used, information about the application that is currently executed in the first external device, hardware operation status information, a battery status, a network status, or sensor-collected information.

6. The method of claim 5, wherein the transmitting of the first message and the second message to the first external device and the second external device comprises:
   identifying priorities of the first external device and the second external device based on the first status information and second status information of the second external device; and
   transmitting the first message and the second message to the first external device and the second external device sequentially according to the priorities.

7. The method of claim 1, further comprising:
   selecting the first external device and the second external device among a plurality of external devices based on a plurality of status information of the plurality of external devices.

8. The method of claim 1, wherein the first message comprises a notification.

9. The method of claim 8, wherein the notification comprises:
   a notification indicator indicating generation of the notification;
   title information indicating a title of the notification; and
   text content included in the notification.

10. The method of claim 9, wherein the notification comprises security information for authenticating a user of the first external device.

11. The method of claim 8,
    wherein the first message comprises a notification indicator indicating generation of the notification, title information indicating a title of the notification, and text content included in the message, and
    wherein the second message comprises title information indicating the title of the notification and text content included in the message.

12. The method of claim 1, further comprising:
   identifying first authentication information based on first security information for authenticating a user of the first external device; and
   identifying second authentication information based on second security information for authenticating a user of the second external device.

13. An electronic device for providing a message, the electronic device comprising:
   a communication module; and
   at least one processor configured to:
      establish a connection with a first external device and a second external device,
      identify a message generated by an application in the electronic device,
      identify capabilities and attributes of the first external device and the second external device connected with the electronic device in response to the message generated by the application,
      generate a first message including a first part of the message based on a capability and an attribute of a first display of the first external device,
      generate a second message including a second part of the message based on a capability and an attribute of a second display of the second external device, the second part of the message being different from the first part of the message, and
      transmit the first message and the second message to the first external device and the second external device, respectively, through the communication module,
   wherein, when a size of the first display is larger than a size of the second display, an amount of the first part of the message is greater than an amount of the second part of the message.

14. The electronic device of claim 13, wherein the capability and the attribute of the first external device includes first status information comprising at least one of hardware information, Operating System (OS) information, application installation information, security information, function information of the first external device, information indicating whether the first external device is currently used, information about the application that is currently executed in the first external device, hardware operation status information, a battery status, a network status, or sensor-collected information.

15. The electronic device of claim 13, wherein the at least one processor is further configured to:
   identify priorities of the first external device and the second external device based on first status information and second status information of the first external device and the second external device, and
   transmit the first message and the second message to the first external device and the second external device sequentially according to the priorities.

16. The electronic device of claim 15, wherein the first message comprises security information for authenticating a user of the first external device.

17. The electronic device of claim 13, wherein the at least one processor is further configured to:
   transmit first security information for authenticating a user of the electronic device to the first external device,
   receive a first response with respect to the user authentication from the first external device,
   transmit second security information for authenticating the user of the electronic device to the second external device and,
   receive a second response with respect to the user authentication from the second external device.

* * * * *